US008202155B2

(12) United States Patent
Uchiyama

(10) Patent No.: US 8,202,155 B2
(45) Date of Patent: Jun. 19, 2012

(54) GAME SYSTEM AND GAME EXECUTION MANAGING METHOD

(75) Inventor: Satoshi Uchiyama, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 381 days.

(21) Appl. No.: 12/312,315

(22) PCT Filed: Nov. 9, 2007

(86) PCT No.: PCT/JP2007/071838
§ 371 (c)(1),
(2), (4) Date: May 5, 2009

(87) PCT Pub. No.: WO2008/059765
PCT Pub. Date: May 22, 2008

(65) Prior Publication Data
US 2010/0056281 A1 Mar. 4, 2010

(30) Foreign Application Priority Data
Nov. 13, 2006 (JP) ................................ 2006-306945

(51) Int. Cl.
*A63F 9/24* (2006.01)

(52) U.S. Cl. ................ 463/23; 463/11; 463/31

(58) Field of Classification Search ................ 463/4, 11, 463/23, 31
See application file for complete search history.

(56) References Cited

U.S. PATENT DOCUMENTS

| 6,398,651 | B1 | 6/2002 | Yamada |
| 6,666,770 | B1 | 12/2003 | Kubo et al. |
| 7,371,178 | B2 | 5/2008 | Yano et al. |
| 7,431,297 | B2 | 10/2008 | Kaji et al. |
| 2003/0022708 | A1 | 1/2003 | Yano et al. |
| 2003/0171142 | A1 | 9/2003 | Kaji et al. |
| 2005/0148390 | A1 | 7/2005 | Murase et al. |
| 2007/0275782 | A1 | 11/2007 | Kaji et al. |
| 2009/0054138 | A1 | 2/2009 | Uchiyama et al. |

FOREIGN PATENT DOCUMENTS

| EP | 1 036 580 | 9/2000 |
| EP | 1 070 522 | 1/2001 |
| EP | 1 557 211 | 7/2005 |
| JP | 2002-282554 | 10/2002 |
| JP | 2002-301264 | 10/2002 |
| JP | 2003-010535 | 1/2003 |
| JP | 2006-014956 | 1/2006 |
| JP | 2006-280658 | 10/2006 |

*Primary Examiner* — Fernando L Toledo
(74) *Attorney, Agent, or Firm* — Jordan and Hamburg LLP

(57) ABSTRACT

The game system includes a plurality of game machines and at least one server device, in which the server device includes: an acquiring means for, among a predetermined number of character cards each associating a game character with an ability value indicating an ability in fighting motion, acquiring use information on the type of a character card presently used in a two-person game for each game; a conversion-value calculating means for calculating a conversion value as result data for narrowing the difference of the ability values corresponding to the types of character cards according to the type of the character card depending upon the amount of the acquired use information; and a transmitting means for associating the conversion value according to the type of the character card with each character card and transmitting the conversion value to each game machine.

19 Claims, 22 Drawing Sheets

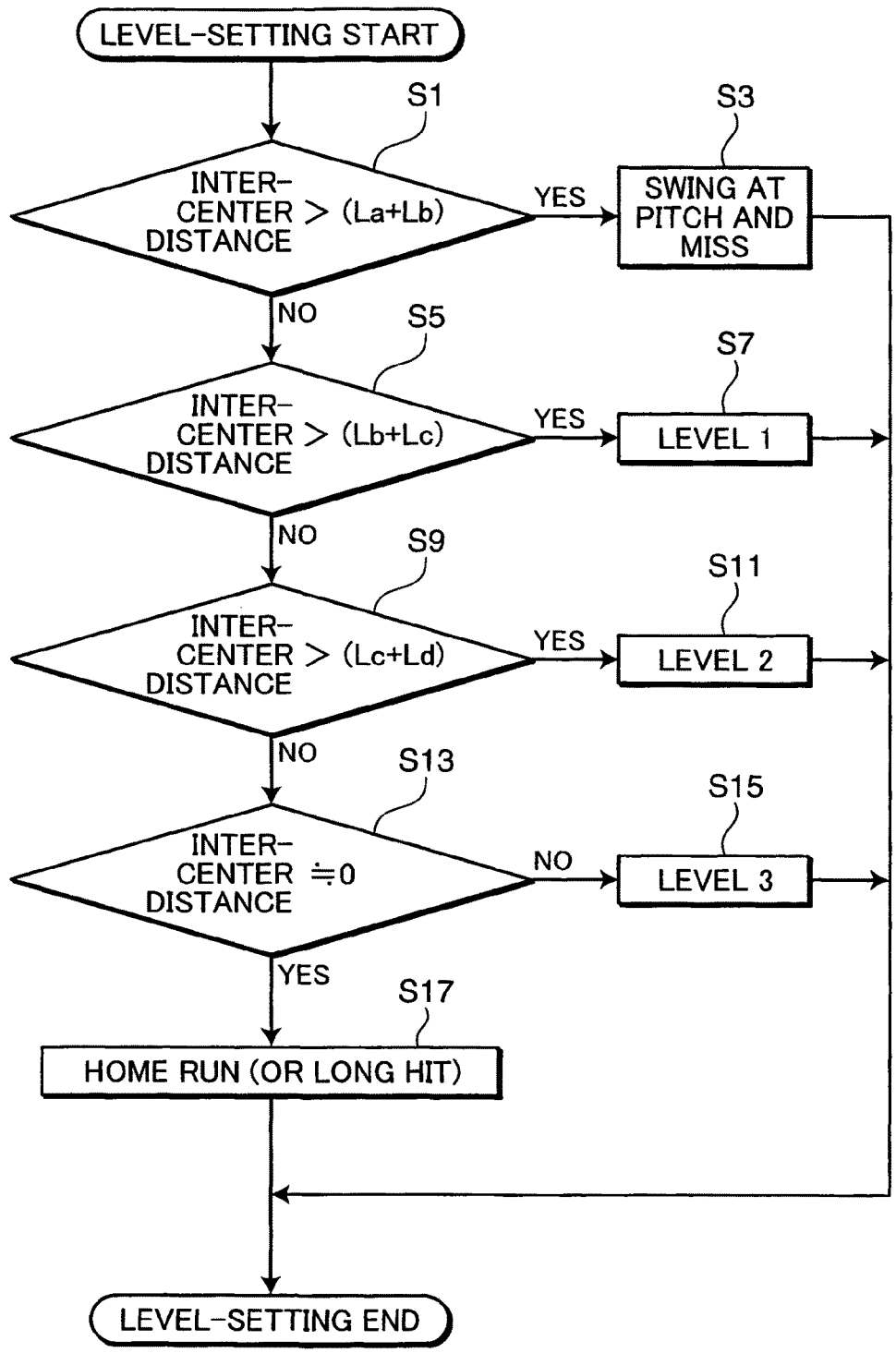

GAME SYSTEM AND GAME EXECUTION MANAGING METHOD

TECHNICAL FIELD

The present invention relates to a game system which includes a plurality of game machines enabling each player of the game machines to play a two-person game over a network using a game medium such as a plurality of types of cards and a server device collecting information on the situation of a game played in the plurality of game machines and reflecting result data obtained from the collected information upon the two-person game, and a game execution managing method for the game system.

BACKGROUND ART

Patent Document 1 proposes a card game machine which, from among a plurality of player cards having individual data written on the back thereof, chooses and places a predetermined number of cards to organize a team on a playing field, reads the data of each placed player card using an image sensor, forms a game image corresponding to the read data and displays it on a display. This card game machine is capable of changing the arrangement of player cards on a playing field and thereby giving an instruction for a change in the position or formation of each player. Hence, the competitive level as a team can be varied, thereby realizing a diverse game.

In the card game machine according to Patent Document 1, however, the position of each player card is changed on a playing field to vary the position or formation of each player, thereby changing the competitive level as a team, merely for the purpose of playing a team game. In short, no change is made in information on individual players related to games.

In addition, the card game machine according to Patent Document 1 requires a game player to possess at least a predetermined number of player cards to execute a card game. In order to have an advantage in a two-person game, the player wants to possess a player card having a greater ability value as individual data written in the card. However, the level of such ability data of individual data written in a player card differs for each player card, and in general, the player is more likely to possess a player card having a greater ability if possessing more player cards. Hence, the number of possessed player cards determines the advantage of a two-person game, thereby spoiling the motivation to the card game of a game player having fewer player cards or less likely to possess a player card having a greater ability value. This tendency is more conspicuous especially if player cards are hard to obtain.

Patent Document 1: Japanese Patent Laid-Open Publication No. 2002-301264

DISCLOSURE OF THE INVENTION

It is an object of the present invention to provide a game system and a game execution managing method capable of solving the problems.

A game system according to an aspect of the present invention includes a plurality of game machines and at least one server device connected thereto over a network to enable players of the plurality of game machines to play a two-person game.

The server device includes: an acquiring means for, among a predetermined number of character cards each associating a game character with an ability value indicating an ability in fighting motion, acquiring use information on the type of a character card presently used in a two-person game for each game; a conversion-value calculating means for calculating a conversion value as result data for narrowing the difference of the ability values corresponding to the types of character cards according to the type of the character card depending upon the amount of the acquired use information; and a transmitting means for associating the conversion value according to the type of the character card with each character card and transmitting the conversion value to each game machine.

Each game machine includes: a display displaying the image of a game character appearing in a two-person game; an operating member receiving an instruction for a virtual fighting motion played by the game character in the two-person game; a reading means for reading at least the type of each character card used in a game; an ability-value calculating means for converting the ability value corresponding to each read character card into a new ability value using the conversion value corresponding to a character card presently used; and a controlling means for allowing a game character to play a fighting motion given by an instruction from the operating member using the ability value obtained by the conversion.

According to this configuration, players can play a two-person game more evenly irrespective of the numbers of character cards which the players possess respectively, thereby motivating the players to play the game.

BRIEF DESCRIPTION OF THE DRAWINGS

FIG. 9 is a flow chart showing the setting of hitting levels for the overlapping degrees.

BEST MODE FOR IMPLEMENTING THE INVENTION

Figure 1:
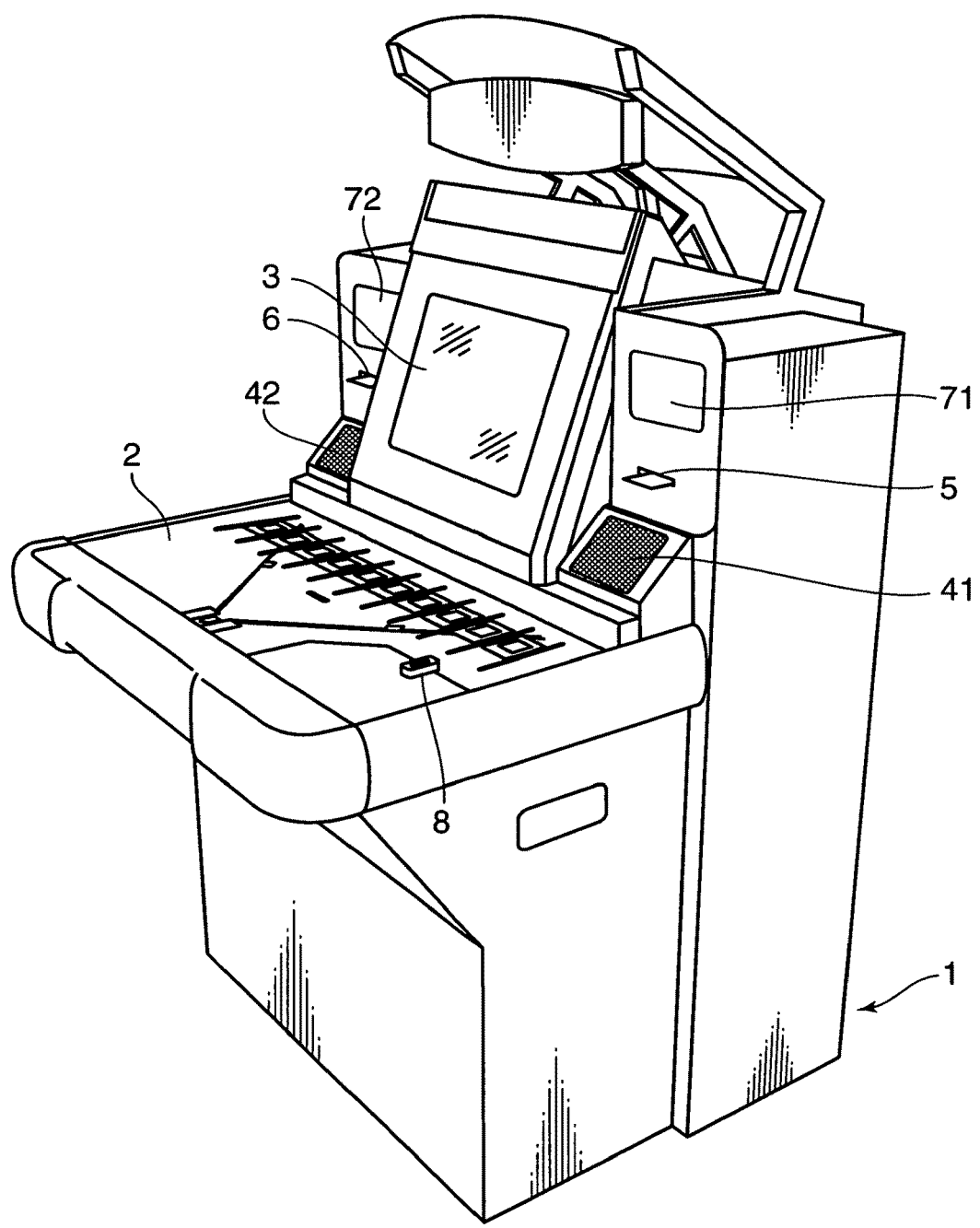
FIG. 1 is a perspective view showing an external appearance of a game machine employed for a game system according to an embodiment of the present invention.
Figure 6:
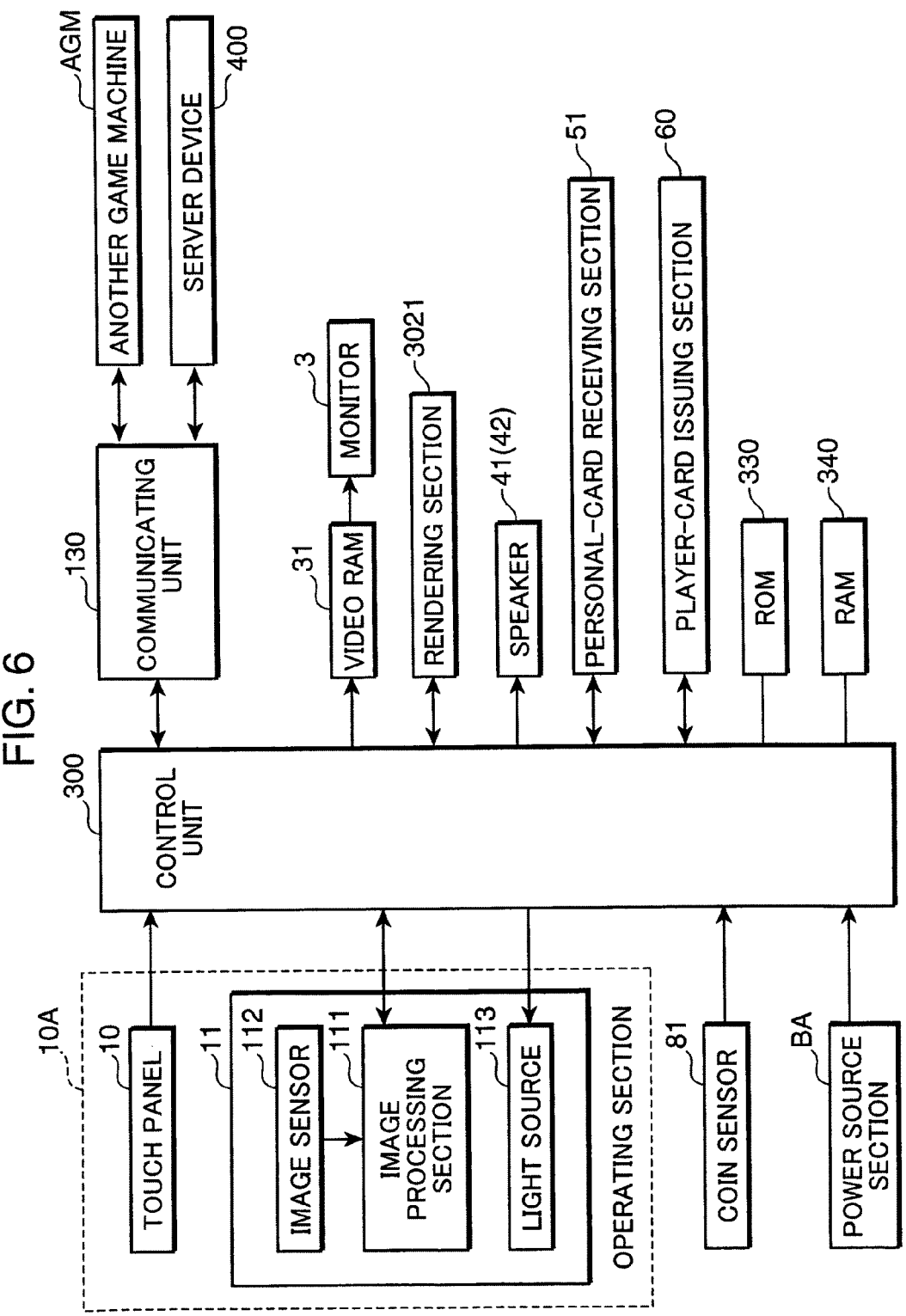
FIG. 6 is a block diagram showing hardware of a control unit and each section incorporated in a control substrate section.

FIG. 1 is a perspective view showing an external appearance of a game machine employed for a game system according to an embodiment of the present invention. The game machine includes a frame 1 having a predetermined solid structure, for example, in a substantially rectangular-parallelepiped shape. It is formed substantially in the middle on the front side with a card placement section 2 having placement surface sections 20 (FIG. 2) on which a game player places a player card in a predetermined shape. Above this, a monitor 3 displaying a game image such as a CRT display and a liquid-crystal display stands, and on the right and left sides of the monitor 3 are arranged speakers 41 and 42 performing an audio output or a sound effect. Above one of the right and left speakers 41 and 42, or the right speaker 41 herein, an insertion slot 5 for a personal card having information for identifying a player is provided, and an issuance slot 6 for a player card (described later) is provided above the left speakers 42. Over the personal-card insertion slot 5 and the player-card issuance slot 6, luminous sections 71 and 72 are respectively provided for performing an illumination effect. The placement section 2 is also formed at a predetermined position with a coin slot 8 guiding a coin as a condition for starting a game. The frame 1 has a signal line for each network drawn from behind which connects with another game machine AGM and a server device 400 (described later: FIG. 6).

Figure 2:
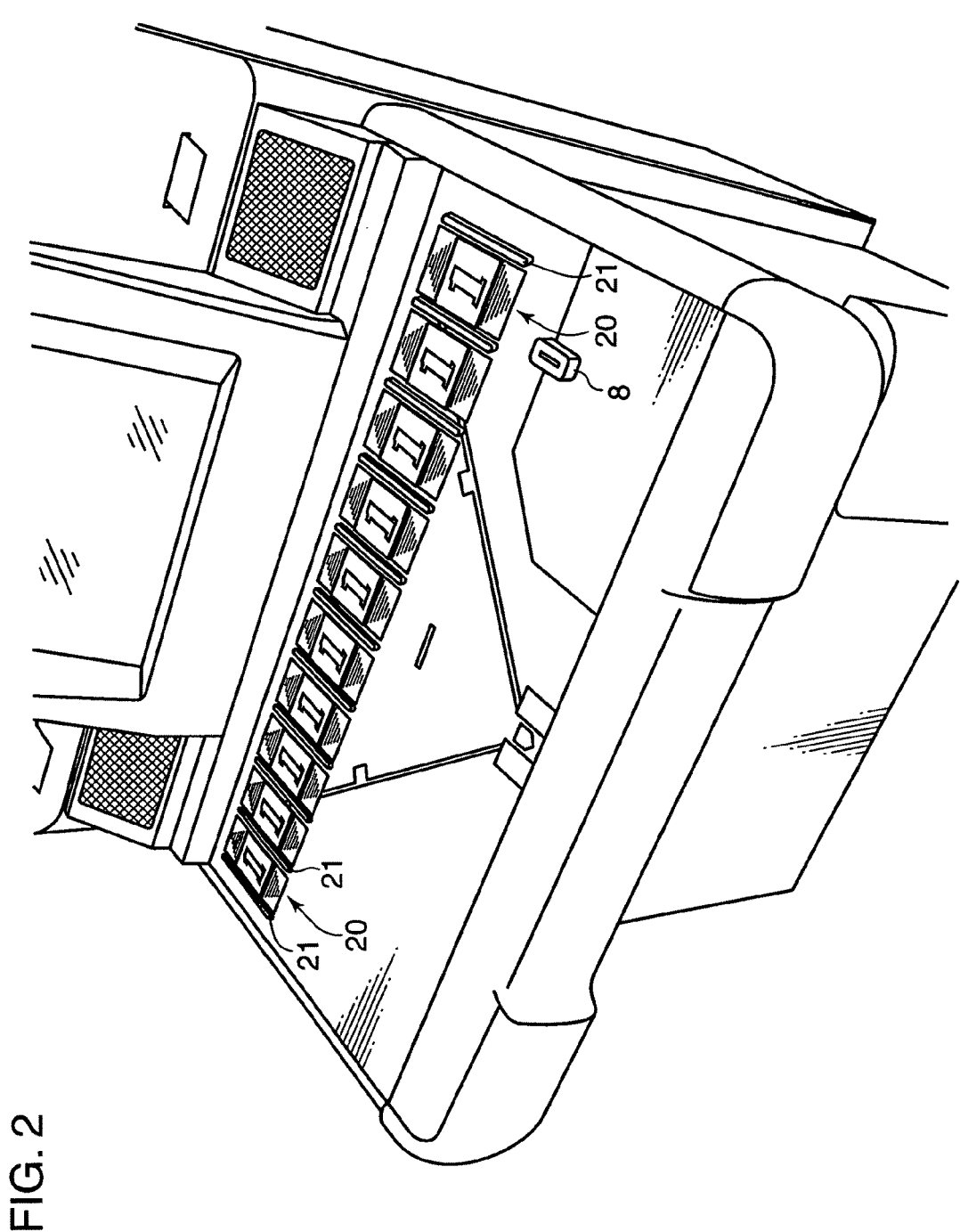
FIG. 2 is a perspective view showing a configuration of a card placement section.

FIG. 2 is a perspective view showing a configuration of the card placement section 2. The upper side thereof has a predetermined shape, or a quadrangle herein, and is horizontal and plane. In this embodiment, a baseball game is designed and a simulated baseball-field picture is drawn on the card placement section 2. A player card 9 as a character card may have a predetermined shape, and as shown in FIG. 3A, a rectangular card is adopted in this embodiment. The card placement section 2 is formed with the plurality of placement surface sections 20 for placing cards laterally at predetermined intervals and ten cards in this embodiment. In a baseball game, at least nine constitute one team, but in this embodiment, ten cards can be placed to thereby place the character card of an alternative player. The placement surface sections 20 have an overall length equivalent to the lateral measurement of the ten player cards 9, and each of them is provided on the right and left sides with a guide member as an auxiliary member for sliding the player card 9 easily from the placement position toward certain directions, or for example, in the front-and-rear directions, and for example, a pair of linear protrusions 21 extending in the sliding directions (herein, the front-and-rear directions) apart by the width of the player card 9 from each other. The linear protrusion 21 has a length in the front-and-rear directions which corresponds to the sliding width of the player card 9.

Figure 3B:
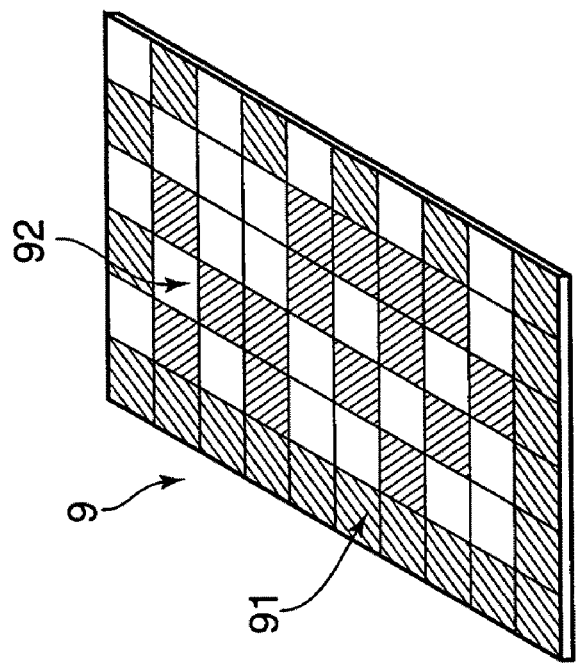
FIG. 3A is a perspective view showing a relationship between a configuration of a player card and a placement surface and FIG. 3B is a perspective view showing contents written on the back surface of the player card.
Figure 3A:
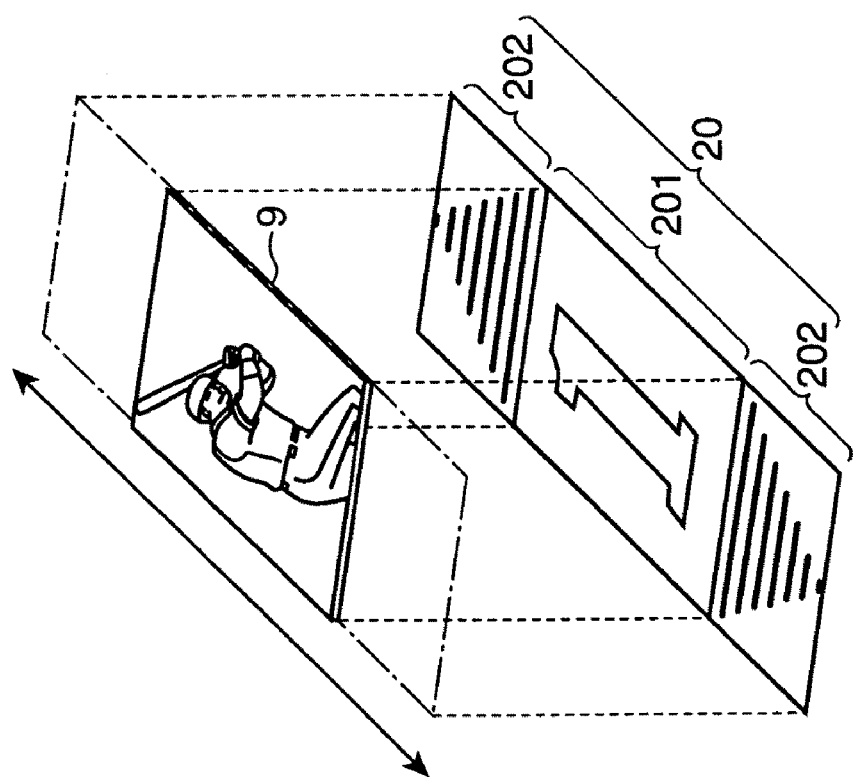

FIG. 3A is a perspective view showing a relationship between a configuration of a player card and a placement surface and FIG. 3B is a perspective view showing contents written on the back surface of the player card. In FIG. 3A, for convenience of explanation, the player card 9 is shown above the placement surface section 20. As shown in FIG. 3A, the placement surface section 20 is made up of a central section 201 and slide sections 202 in the front-and-rear directions. The central section 201 has the same measurements as the player card 9, and the slide section 202 has a required longitudinal length relative to the central section 201, for example, it may be substantially half of the longitudinal length of the player card 9. In the slide section 202, as described later, the player card 9 is shifted (slid) within the range defined by an arrow with respect to the central section 201 to thereby vary the aspect of a motion (described later) made by the character displayed on the monitor 3 corresponding to the player card 9. The player card 9 has in print a player character image on the face and an identifiable photo image of the player face, player information such as the name and unidentifiable player identification data on the back.

As shown in FIG. 3B, the marks printed on the back surface of the player card 9 includes a position detection mark 91 for detecting a placement position of the player card 9 on the placement surface section 20, and a character mark 92 indicating player identification data as identification data on the player character corresponding to the player card 9. As the player identification data, an identification number is usable, and for convenience of explanation herein, the surface of the player card 9 is divided into 6-row×10-line areas and the periphery thereof is used as the position detection mark 91 while the inner 4-row×8-line areas is used as the character mark 92. In practice, however, it is divided into areas having rows and lines enough to store necessary data, and the player identification data can be recorded in various methods.

In the position detection mark 91, a specified material is applied to the whole area of two adjacent sides of the four sides and the alternate areas in the row and line directions of the other two sides. The formation of the continuous part and the alternate part is useful in detecting the player card 9 placed upside down to thereby ensure a position detection in the correct posture.

Figure 7:
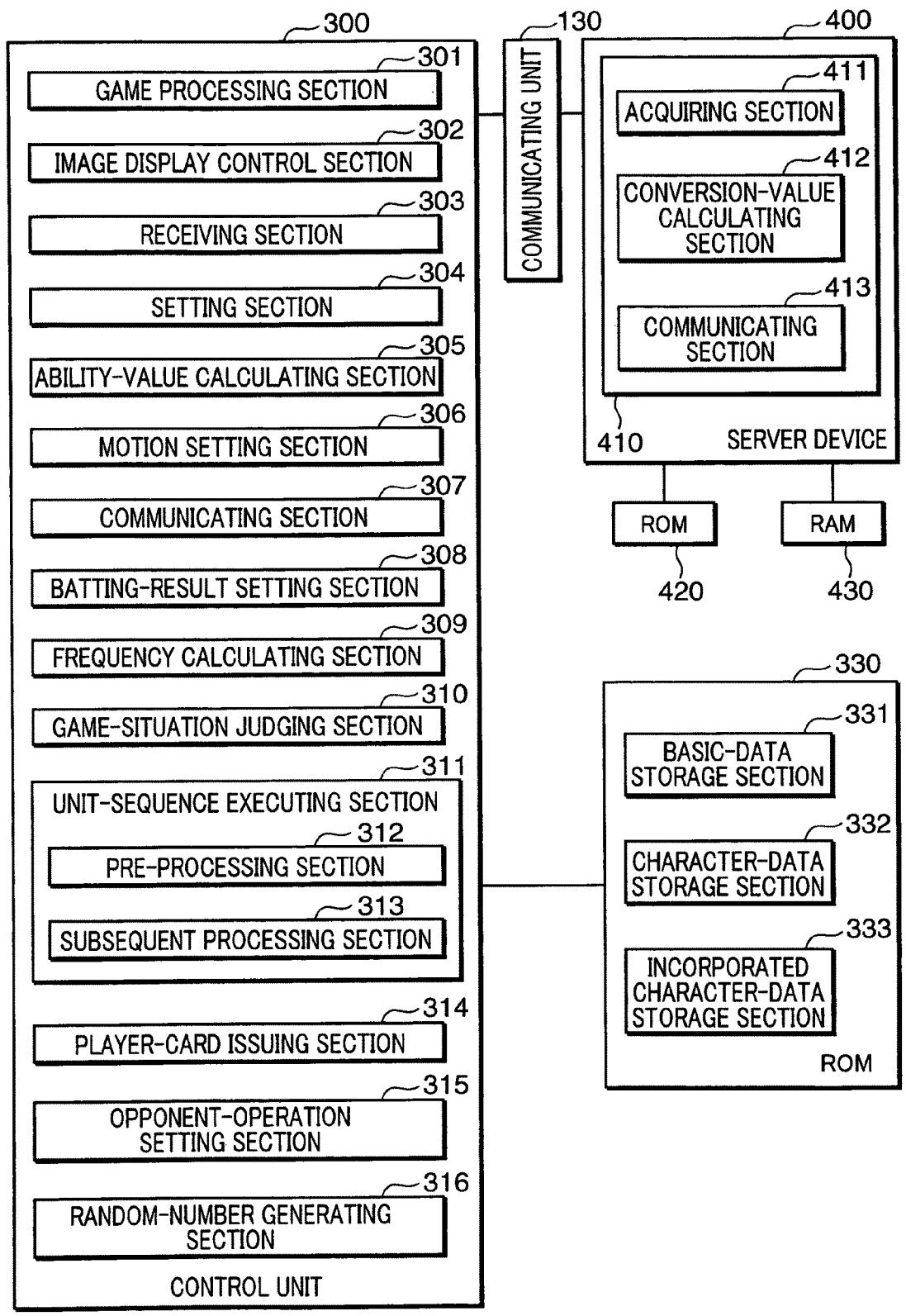
FIG. 7 is a block diagram showing functions of the control unit.

In the character mark 92, the specified material is applied or given to each area inside by one area from the periphery which is set as one bit to thereby form player identification data. All the game machines have player character data (image data on player characters displayed on the monitor 3 and player parameters (used as a fielder parameter, a pitcher parameter and a batter parameter according to the contents) indicating ability values) corresponding to player identification data on all the players of player characters prepared beforehand which is respectively stored in advance in a character-data storage section 332 (FIG. 7). In a game, the image data and the player parameters are collated with player identification data specified by reading the player card 9 and are read and used from the character-data storage section 332. Among all the player characters corresponding to the players card stored in advance in the character-data storage section 332, as described later, a predetermined number of player characters are each given a flag or the like whose identification indicator is stored beforehand in an incorporated character-data storage section 333 (FIG. 7) in such a way that these player characters are substituted for the player card 9 and appear selectively in a baseball game. Further, replaceable player characters may include the ones prepared other than the player character corresponding to the player card 9 and these player characters are stored together with player parameters in the incorporated character-data storage section 333. Alternatively, it may be appreciated that a predetermined number of player characters not in the player-character unit but in the team unit are stored in advance in such a way that they can be chosen as a replaceable team. In substituting such an incorporated player character, it is chosen via a touch panel 10 (described later) and the contents of the choice are received via a receiving section 303 (described later). The substituted and chosen player character is designed to be treated in a game equally with the player character of the used player card 9.

Although the applied material may be a visible material, in this embodiment, an invisible material, for example, reacting to infrared light is employed because a means of detecting infrared light is utilized as described later. As an example, the player card 9 is made of a material absorbing infrared light, or the back surface is coated with the absorptive material and a mark is made thereon. Further, at least the placement surface section 20 of the card placement section 2 is formed of a material transmitting infrared light.

The character-data storage section 332 has in storage player parameters corresponding to player identification data for specifying player characters. As the player parameters, abilities (including skills) are stored as follows. For example, in the case of a batter, the ability types include fielder parameters as common items such as "ballistic trajectory", "ball meeting", "power", "running ability", "error avoidance value" and "main position", and further include fielder parameters as special ability items to individual characters such as "overbearing", "ball-meeting correction against a left-handed pitcher", "power correction against a left-handed pitcher", "chance correction", "bat-swing timing", "average hitter", "powerful hitter", "scoring-chance giving batter", "Sayonara game-closing hitter", "withstanding adversity", "hitting to the opposite field", "hitting over a wide angle", "infield hit", "bunt", "good hitter with the bases full", "good pinch-hitter", "numerous-strikeouts getting batter", "first-pitch hitting", "multi-hits making", "hits in a row", "number-4 batter", "pair's home runs", "holding-out batter", "good fielder", "base stealing", "self-hurling", "base running", "home sliding", "ball tossing", "blocking", "team livening-up player", "run-scoring error", "first-inning homer-hitting lead-off man", "catcher's leading level", "laser beam (speedy ball return)" and "tackle (indicating power and vigor)".

In the case of a pitcher, the ability types include pitcher parameters as common items such as "ball speed", "slider", "curveball", "fork ball", "sinker" and "screwball" (called non-straight pitch level) and "control", "powerful straight pitch", "pitching physique", "starter's tune-up ability", "fatigue-recovering ability" and "fatigue-recovering ability", and further include pitcher parameters as special ability items to individual characters such as "overbearing", "correction against a left-handed batter", "clutch", "anti-offence hold-out", "runner", "pitching at the start", "getting better toward the late innings", "immediately before", "release", "zipping fast ball", "game luck", "runner pegging", "batted-ball reaction", "quick temper", "walk", "careless dangerous pitch rate", "fast motion", "close game", "sense of responsibility", "physical-energy allotment", "ball-speed stability" and "poker face".

The fielder parameters and the pitcher parameters are set herein for all player characters, and the ability value or tendency value (in plus and minus directions) of each player parameter is determined by a predetermined gradation, for example, ten grades (in this case, from minimum [1] to maximum level [10]) or further twenty grades. Alternatively, it may be appreciated that the number of grades is suitably set according to the type of ability value or tendency value.

Figure 4:
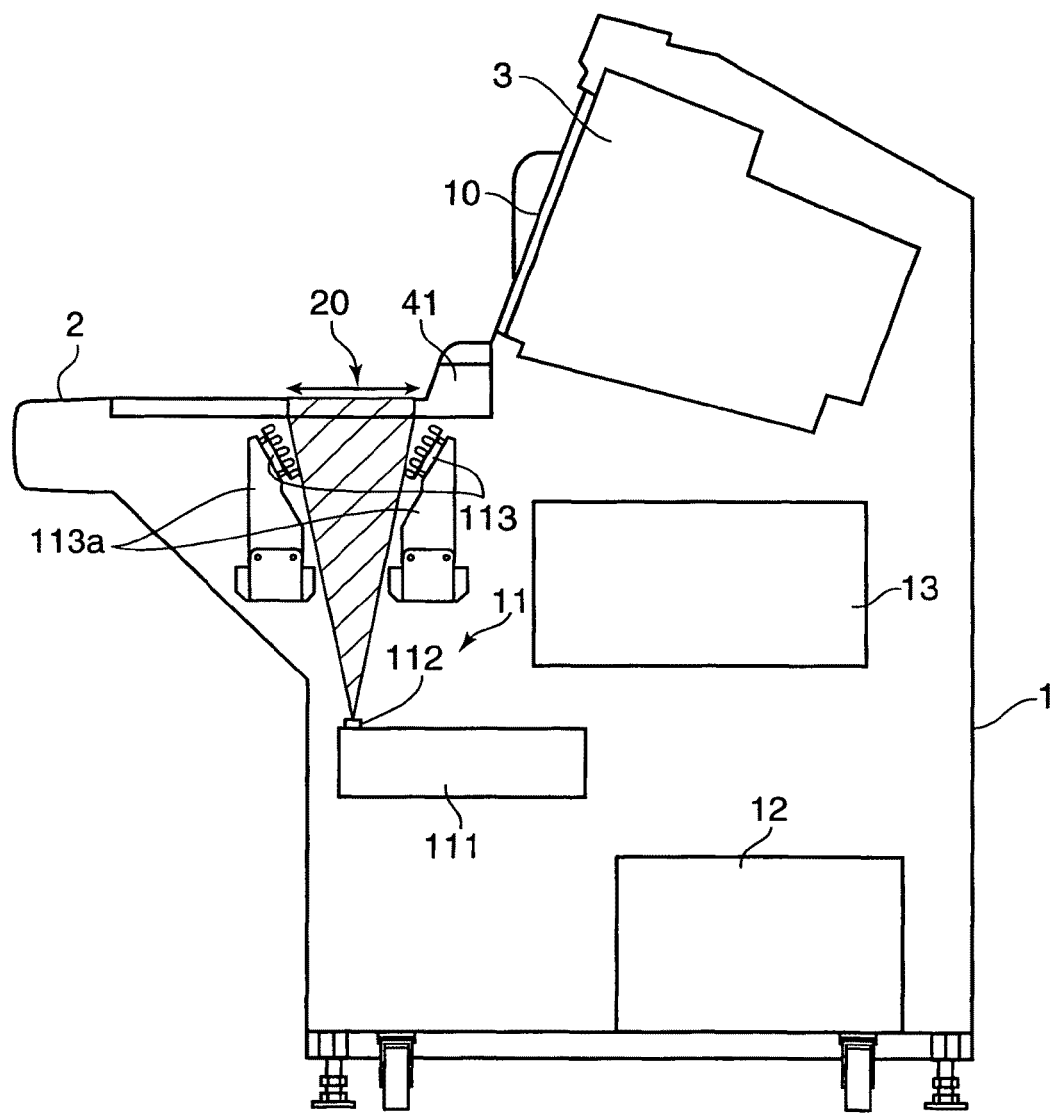
FIG. 4 is a side sectional view of the game machine.
Figure 5:
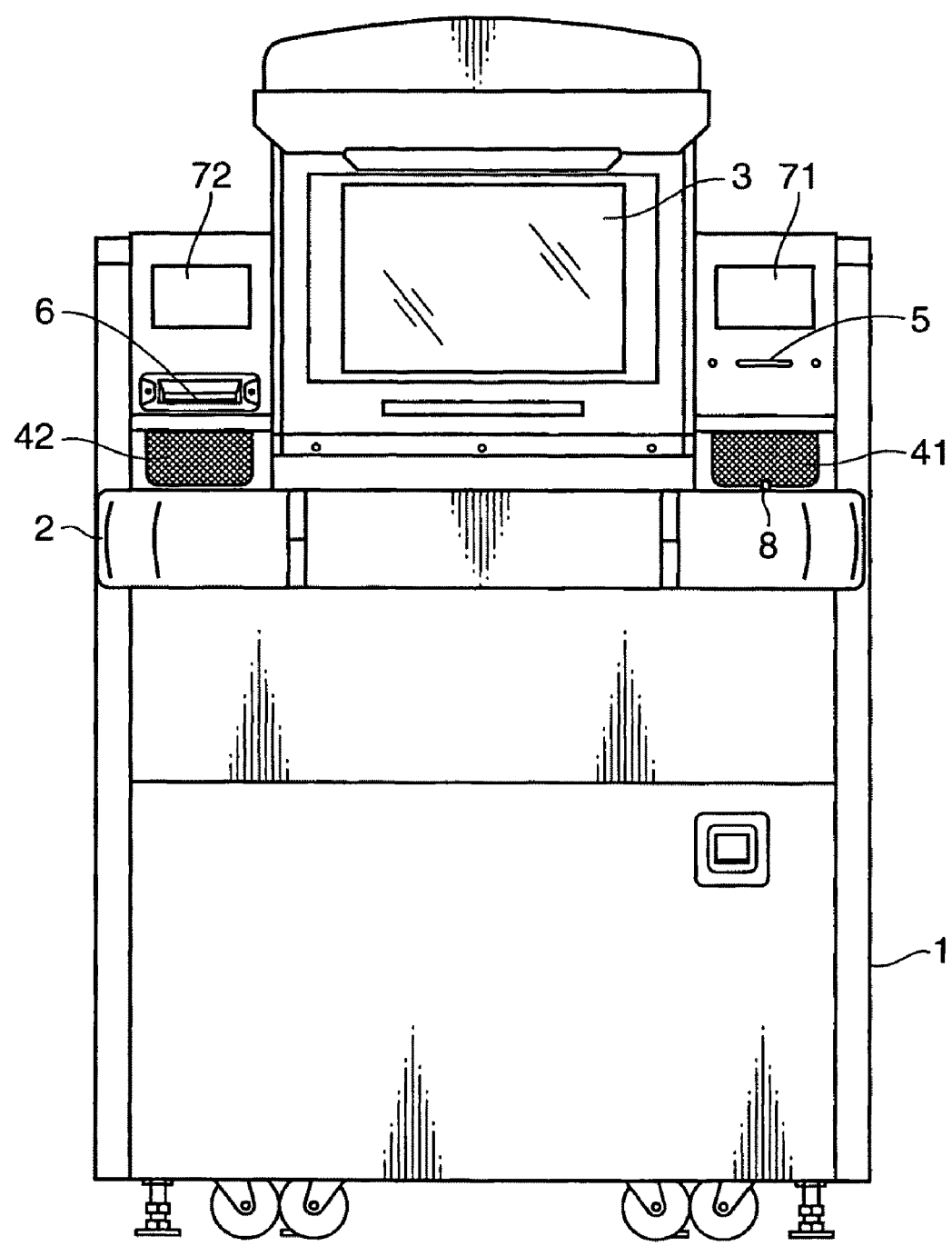
FIG. 5 is a front view of the game machine.

FIG. 4 is a side sectional view of the game machine and FIG. 5 is a front view thereof. In FIG. 4, the monitor 3 is provided on the tube surface with the touch panel 10 as a transparent thin-layer pressure sensitive element. The touch panel 10—known touch panel—detects a button given an instruction from the address and pressing position of each button prompting a choice or the like displayed on the screen of the monitor 3. The touch panel 10 also detects any position inside of a regional image expressing the strike zone virtually when the position is pressed. Specifically, pressing-position coordinates detected by the touch panel 10 are replaced with the coordinates on the display screen, and they are compared with the display coordinates inside of the regional image, thereby identifying any pressed position inside of the regional image.

The frame 1 houses an imaging section 11 below the placement surface section 20. The imaging section 11 detects a placement position of the player card 9 placed on the placement surface section 20 and reads information on the back side of the player card 9, and is formed by a frame which houses an image processing section 111 controlling the imaging operation and processing an image, an image sensor 112 as an imaging means (digital imaging device such as a CCD camera) attached to the top thereof, and a light source 113 emitting infrared light. The image sensor 112 has such an angle of view that the whole placement surface section 20 is included in the field of view to thereby image the marks 91 and 92 on the back side of the player card 9 placed on the placement surface section 20. As is unseen in the figure, in this embodiment, a predetermined number of the image sensors 112, for example, two, are arranged in the lateral directions (in the paper-depth directions in FIG. 4), and each image sensor 112 has a visual field including the five right-hand placement surface sections 20 and the five left-hand placement surface sections 20.

The light source 113 is supported by a light-source support member 113a and located obliquely in the front-and-rear directions below the card placement section 2. From this oblique lower position, herein, it emits an infrared ray (including a far-infrared ray) having a predetermined wave range toward the placement surface section 20, and irradiates the placement surface section 20 or specifically, the back side of the player card 9 placed on the card placement section 2 with the infrared light. In order to irradiate all the placement surface sections 20 uniformly, a plurality of the light sources 113 are arranged at required intervals or substantially continuously in the lateral directions. Further, they are arranged both on the front and back sides of the placement surface section 20 to thereby make the irradiation more uniform, and they are set outside of the angle of view of the image sensor 112 lest they should be an obstacle to imaging. The image sensor 112 is made up of many photoelectric conversion elements arranged in matrix form. The infrared rays from the light sources 113 are reflected by the back side of the player card 9 on the card placement section 2, and a light image of the infrared light expressing the marks 91 and 92 are picked up. Then, each photoelectric conversion element receives the light image periodically, or specifically, converts it into an electric-signal level corresponding to the quantity of received light. Hence, a filter (not shown) preferably transmitting only this infrared light is arranged in front of the photoelectric conversion elements (not shown). The image processing section 111 transfers (introduces) an image periodically picked up into an internal memory (not shown), extracts the position detection mark 91 as a memory address from the picked-up image expanded in the memory, specifies the shape, for example, using a pattern recognition art or the like, and thereby, calculates the card placement position of the player card 9 on the card placement section 2. Using information on the detected pixel address of the position detection mark 91 in the picked-up image, the image processing section 111 reads the player identification data of the character mark 92, for example, as bit information of each area in the row and line directions.

The frame 1 houses a power source section 12 supplying electric power at a required level to each section of the game machine, and a control substrate section 13 having a control substrate or the like inside for governing and executing a game processing.

FIG. 6 is a block diagram showing hardware of a control unit and each section incorporated in a control substrate section. In the figure, an interface between a control unit 300 and each section, or a section generating a driving signal for driving each section in response to a control instruction, is described if necessary as a conventional means, but otherwise omitted.

A communicating unit 130 is connected to another game machine AGM over a network, and transmits and receives game data to and from another game machine AGM. A required number of the game machines are designed to be installed in a store (amusement arcade), and another game machine AGM may be installed in the same store and another store. According to an aspect in which the game machines are installed in a plurality of stores, the game machines are capable of executing a fighting motion between the different stores via the communicating unit 130. The communicating unit 130 is communicably connected to the server device 400 over a network. If a personal card is inserted in a game machine, then from information of the personal card, data necessary for a game processing among the pieces of data on the game history of a corresponding player, for example, a predetermined history data or the like in the past game described later, if necessary, is transferred to the game machine and a game machine of the opponent in the two-person game, and when the game ends, a game result of the game is taken in to thereby update the history and manage the updated data. The server device 400 collects (acquires) information on a game situation (mainly the state of use of the type of the player card 9 in each game machine) from each game machine and distributes a processing result calculated based on the collected information to each game machine.

The touch panel 10 and the imaging section 11 constitute an operating section 10A. The coin slot 8 as a condition for starting a game is provided inside with a coin sensor 81 for authenticating an inserted coin and counting the number of coins required. An inserted coin is stored in a safe (box: not shown) inside of the frame 1. A personal-card receiving section 51 is provided inside of the personal-card insertion slot 5 and collates an inserted card with a player via a player-information storage section (not shown) inside of the server device 400 to thereby decide whether the player is a member. It returns the card from the personal-card insertion slot 5 after the game ends.

A player-card issuing section 60 has many types of the piled player cards 9 stored in a card storage section (not shown) inside thereof, and every time a game ends, sends out a predetermined number of player cards 9, or one herein, from the card storage section to the player-card issuance slot 6 using a pickup section, and thereby gives (presents) it to the player. This forms a setup for enabling a player to collect (acquire) the player card and urges the player to play a game. Besides, the number of cards to be issued may be varied according to the game result. In this embodiment, the player cards 9 are piled at random regardless of the types thereof, and the pickup section sends out a player card at the top in order, thereby randomly offering a player different types of player cards. In addition, player cards sorted out according to the ability value of a player parameter may be separately stored in a plurality of card storage sections to give a player card having a higher ability value to a player judged a winner in a game result (i.e., a player card having a lower ability value to a player judged a loser), thereby encouraging the player to acquire a higher ability-value player card. Alternatively, it may be appreciated that a winner is given more player cards than a loser.

A ROM 330 has in storage in table form a game program for operating the game, all image data displayed on the monitor 3, a rendering program for forming a three-dimensional image in a game space, parameters necessary for determining the progress of a game or a game result, or various kinds of data as elements for decision. These are stored in a basic-data storage section 331 (FIG. 7) of the ROM 330. Particularly, since a baseball game is designed in this embodiment, the basic-data storage section 331 has in storage a control program for executing a processing for the field-taking and at-bat sides created by the rules of real baseball, and fielder parameters, pitcher parameters and player-character image data on all players supposed to appear as characters in the game associated with player identification data (the character-data storage section 332 and the incorporated character-data storage section 333).

A RAM 340 includes a work area for saving data temporarily in the middle of a processing, and during a game, saves various kinds of data read from the ROM 330 or each parameter such as an ability corresponding to the type of each player card 9 obtained in the imaging section 11 to thereby read and reflect them upon a game if necessary.

A video RAM 31 has at least a memory capacity corresponding to the display pixels of the monitor 3 and is used for forming a display image. A rendering section 3021 is a hardware circuit section receiving a rendering instruction from the control unit 300 and expanding a display image to the video RAM 31.

A power source section BA is formed by a power circuit and a power switch for operating the power circuit, and if the power switch is turned on to supply the power, then operates the control unit 300 to thereby display a demonstration image on the monitor 3 of the game machine and make a game acceptable (e.g., waiting for a personal card or a coin to be inserted).

FIG. 7 is a block diagram showing functions of a control unit and a server device. The control unit 300 includes: a game processing section 301 which governs and controls the progress of the game based upon a game program and an input operation in the operating section 10A; an image display control section 302 controlling the display of a game image on the monitor 3; a receiving section 303 receiving input-operation information from the operating section 10A; a setting section 304 which sets the position or shape of a mark image on the basis of the position of a pitch or the position of a bat swing when a "course designation" button (described later) is chosen which is displayed on the monitor 3; an ability-value calculating section 305 which converts the ability value of a player parameter using a conversion value (described later) delivered from the server device 400 and offers the player parameter after the conversion to the setting section 304; a motion setting section 306 creating pitching data on a pitch of a pitcher character or batting data on a bat-swing of a batter character based upon the contents received by the receiving section 303; a communicating section 307 which exchanges pitching data or batting data with another game machine AGM and transmits and receives data necessary for a center monitor CM via the communicating unit 130, and if necessary, exchanges data with the server device 400; a batting-result setting section 308 determining a batting result based upon the data received by the motion setting section 306 and another game machine AGM; a frequency calculating section 309 calculating data on the tendency of a designated position in a pitch position or a bat-swing position using the past game history of an opponent player in a game; a game-situation judging section 310 managing the situation of a game and judging a game situation affecting the result of a game; a unit-sequence executing section 311 which controls each sequence respectively executed using the contents determined by the batting-result setting section 308, the contents of an input operation from the operating section 10A and a pitcher parameter if a self-character is a pitcher or a fielder parameter if it is a fielder, or without executing any input operation; a player-card issuing section 314 issuing the player card 9; an opponent-operation setting section 315 deputizing for the processing of an opponent in a so-called CPU game against an internal computer using the game machine; and a random-number generating section 316 generating a pseudo-random number used for a probability processing.

The server device 400 includes a control unit 410 governing and controlling the operation of the server device 400, a ROM 420 has a specified processing program in storage and a RAM 430 storing data temporarily in the middle of a processing. The control unit 410 includes an acquiring section 411 collecting (acquiring) information on a game situation in each game machine via each communicating unit 130 of all game machines, a conversion-value calculating section 412 which calculates a conversion value for converting the original ability value (stored in the character-data storage section 332) according to the result of use of each player in a game from the acquired data, and a communicating section 413 transmitting and receiving data to and from each game machine.

The acquiring section 411 is supplied electric power and acquires data on the type of the player card 9 presently used from a game machine in execution of a game, via the imaging section 11, the control unit 300 and the communicating unit 130. A decision whether or not a game is now in execution may be made by scanning (making a data transmission request to) all the game machines at predetermined periods and monitoring the execution of each game through whether or not data on a personal card or a coin insertion as a game starting condition has been acquired, or receiving game-start and game-end signals for starting and ending the game which are generated and transmitted by the control unit 300. These signals may be transmitted together with personal-card information on the user of a game machine at present or identification information set in advance for each game machine to identify the game machine which is used for specifying the game machine.

The acquiring section 411 creates a histogram for each player card from the type information of the player card 9 presently used for each game machine and calculates the total frequency of game executions (game-execution frequency). Specifically, the frequency of a player card in use is calculated by a cumulative addition for each type. The game-execution frequency is calculated by making a cumulative addition for the decision results that a game is now in execution by the above method. The calculation period is managed by an internal clock and may be a unit of one day, morning and afternoon or several days, for example, one week. Herein, it is described as the one-day unit, and for example, when the frequency of game executions is "2000" per day, in order of the height of a use rate, if the player card 9 of a player name "ABC" as the type of the player card 9 is used "1000" times, the player card 9 of a player name "DEF" is used "500" times, the player card 9 of a player name "GHI" is used "200" times, . . . and the player card 9 of each player name "XYZ", . . . , "ooo" is used "0" times, then each number "1000", "500", "200", . . . , "0" is acquired as a use frequency corresponding to the player cards, respectively.

The conversion-value calculating section 412 calculates a use rate for each player card. In the above example, the use rate is "0.5" for the player name "ABC", "0.25" for the player name "DEF", "0.1" for the player name "GHI", . . . , "0.0" for each player name "XYZ", . . . , "ooo". Instead of the above rates, they may be numeric values normalized by a maximum use rate as a reference, or the above use frequencies themselves may be utilized because the population parameter is common, and herein, all of them are called use rates.

The conversion-value calculating section 412 also calculates a conversion value for narrowing the difference in player parameter between each player card 9, or herein, a conversion value for making the ability value of a player parameter larger as the calculated use rate becomes lower, for each type of player card. Although it is a so-called barometer of popularity that a player card having a higher use rate has naturally a greater player-parameter ability value, a player has not always (a large number of) more popular player cards at first. Even in the situation, the player can play a game more evenly against a player having a more popular player card. A player card having the highest use rate is given a conversion value of "1" for the player-parameter ability value, meaning offering no change in the ability value.

On the other hand, in terms of a conversion value for making the player-parameter ability value larger as the calculated use rate becomes lower, a player card having the lowest use rate may be given such a conversion factor (conversion value) that the player-parameter ability values thereof become equal to the ability values in all player parameters or preset parameters of a player card having the highest use rate. A player card having an intermediate use rate may be given a conversion factor (conversion value) corresponding to the ratio of the ability values thereof to the ability values of the highest use rate. In addition, without making a comparison with the player-parameter ability value of a player card having the highest use rate, the conversion value may also be gradually lowered continuously or by specified grades in such a way that the conversion value for the maximum use rate is set to "1", the conversion value for the minimum use rate is set to a predetermined value more than "1" and the conversion value approximates "1" gradually in proportion to the use rate as the use rate becomes higher. Alternatively, it may be appreciated that the use rate is divided by predetermined grades to thereby set each conversion value in the above method. Further, a conversion value may be set using a use rate of 100% as a reference, or the use rate may be divided into several ones to thereby set a conversion value as such an additional value or a multiplication coefficient value that a larger value is added to the original ability value from a lower use rate.

An example will be below described using the use rates illustrated above. In the above example, the player card "ABC" is "0.5", the player card "DEF" is "0.25", the player card "GHI" is "0.1", . . . , the player cards "XYZ", . . . , "ooo" are "0.0", and hence, in the player card "ABC" having the maximum use rate, "0.5" is replaced (normalized) by a value of "1". Using this as a reference, each value of the player card "DEF", the player card "GHI", . . . , the player cards "XYZ", . . . , "ooo" is replaced by "0.5", "0.2", . . . , "0.0", respectively. Then, a predetermined value, for example, a conversion value of "2.0" (meaning multiplying the original ability value by 2.0), is set for the ability values in all player parameters or preset parameters of a player card having the lowest use rate (which is commonly a use rate of "0.0", but in this case, this is replaced, for example, by "0.1" as the lowest value for convenience of calculation) obtained by the reduction. In terms of a player card having an intermediate use rate, an ability value may be calculated proportionally, for example, in each unit of a predetermined value such as by "0.1" from a highest multiplying factor of 2.0 toward a lowest multiplying factor of 1.0. The ability value of a player card, for example, having a use rate of "0.2" a little higher than the lowest use rate "0.1" is set to "1.9", the ability value of a player card having an intermediate use rate is set to "1.5", and the ability value of a player card having a use rate slightly lower than the highest is set to "1.1". If an ability value exceeds the highest value after a conversion, a maximum value may be set within a range settable as an ability value. In this way, a conversion value can be calculated and set.

Further, a conversion value may be set only for a player card, or similarly applied to an incorporated character. According to an aspect where a conversion value is set for an incorporated character, even if a player does not possess the types and number of player cards 9 necessary for playing a baseball game, then the original ability values are converted to enhance the unexpectedness, thereby enabling the player to play a two-person game evenly enough (without having so much disadvantage) simply using the substituted incorporated character.

The communicating section 413 distributes (transmits) the calculated conversion value of each player card basically to all the game machines. Specifically, it saves the conversion value temporarily in a buffer or the like of a sleeping game machine and brings it into the RAM 340 as the power is supplied early in the morning. Alternatively, it may be appreciated that it transmits the conversion value to each game machine as the server device 400 receives a starting signal generated when the power is supplied the next morning, or transmits it to a game machine after checking on a game start (e.g., a signal generated when a personal card is inserted).

The image display control section 302 includes the video RAM 31 or the like and displays each image necessary for playing a game on the monitor 3, for example, a baseball ground, each player character (at least a pitcher character and a batter character) on the at-bat and field-taking sides, a ball character, a bat character, a regional image expressing the strike zone (described later) virtually, and first and second mark images (described later) generated when a position is designated as described later. The image display control section 302 also displays an incorporated-character image and a list of player parameters as a specified screen image for selection for choosing an incorporated character as a substituted player instead of a player card, and thereby, accepts a choice via the receiving section 303 by receiving a direct pressing operation for a display part on the screen image from the touch panel 10. In short, the image display control section 302 functions as an incorporated-character selection-image displaying means, a character-display controlling means, a regional-image display controlling means, a mark-display controlling means and the like.

This embodiment is designed to offer a baseball game in which players compete with each other for more final scored runs by executing a motion of one at-bat (below called one sequence) for a self-character (pitcher character as a sequence on the field-taking side and batter character as a sequence on the at-bat side) given an instruction for a motion from a game player operating a game machine to confront an opponent character (batter character or pitcher character opposing the self-character) given an instruction from an opponent player (another game machine or an internal CPU player) in a pitcher-batter relationship, and executing this sequence a total of twenty-seven times for nine innings each including three outs continuously by the baseball rules. In this embodiment, one pitch is thrown for one batter in a game.

A pitcher character, a batter character, another player character if necessary, a background image simulating a baseball ground or the like is made up of a required number of polygons in such a way that they can be three-dimensionally rendered. On the basis of a rendering instruction from the image display control section 302, the rendering section 3021 (FIG. 6) makes a calculation for converting a position in a three-dimensional space into a position in a pseudo-three-dimensional space, a calculation for a light source or the like, and based upon the calculation result, writes data on an image to be rendered in the video RAM 31, for example, writes (attaches) texture data on the area of the video RAM 31 designated by polygons.

A relationship between an operation of the image display control section 302 and an operation of the rendering section 3021 will be described here. On the basis of an operating system (OS) recorded in the ROM 330, the image display control section 302 reads image data, control program data and game program data from the ROM 330. A part or the whole of the read image data, control program data and the like is held on the RAM 340. Thereafter, the image display control section 302 advances an image display processing based upon a rendering part of the control program stored on the RAM 340, each kind of data (image data or audio data including another character image such as the polygons or texture of a displayed object) and a detection signal or the like from a detecting section. In short, the image display control section 302 generates a command as a task for image rendering or audio output suitably according to a game progress. On the basis of the command, the rendering section 3021 makes a calculation for an eye-point position, a calculation for the position or the like of a character in a three-dimensional space (naturally, the same in a two-dimensional space) for the eye-point position, a light-source calculation or the like, and generates and processes audio data. Sequentially, based on the calculation results, it executing a writing processing or the like for data on an image to be rendered in the video RAM 31. The image data written in the video RAM 31 is supplied to the monitor 3 (after supplied to a D/A converter via an interface and converted into an analog image signal) and displayed as an image on a tube surface thereof. In the same way, audio data or sound-effect data is outputted via the RAM 340 from the ROM 330 and is outputted as audio from the speakers 41 and 42 (via an amplifier after supplied to the D/A converter via the interface and converted into an analog audio signal).

There are a rendering instruction to render a solid image by polygons and a rendering instruction to render an ordinary two-dimensional image. Herein, a polygon is a polygonal two-dimensional image and triangular or quadrangular in this embodiment. The rendering instruction to render a solid image by polygons is made up of polygon-vertex address data read from the ROM 330, texture address data on the storage position of texture data attached to the polygons, color-pallet address data on the storage position of color pallet data indicating the color of the texture data and brightness data indicating the brightness of the texture. One character (or object) is made up of many polygons. The image display control section 302 stores the coordinate data of each polygon in a three-dimensional space in the RAM 340 and executes the following processing in moving a character or the like on the screen of the monitor 3.

On the basis of the three-dimensional coordinate data of the vertex of each polygon temporarily held in the RAM 340 and the movement-distance and rotation-angle data of each polygon, the image display control section 302 calculates a three-dimensional coordinate data of each polygon after moved and rotated one after another. Among the thus calculated three-dimensional coordinate data of each polygon, horizontal and vertical coordinate data is supplied as address data on the display area of the RAM 340 or polygon-vertex address data to the rendering section 3021. The rendering section 3021 writes texture data indicated by texture address data allocated in advance on the triangular or quadrangular display area expressed by three or four pieces of polygon-vertex address data, thereby displaying character (or object) having many polygons and texture data attached thereto on the display surface of the monitor 3.

The receiving section 303 receives information on pressing by a game player from the operating section 10A or specifically the touch panel 10, information on the placement position of a player card by a player operation from the imaging section 11, and data for identifying a player on the back surface of the player card 9.

The ROM 330 has a plurality of items as a part of basic data set therein which can be chosen in a two-person game. In this embodiment, the items include "sign (command)", "pinch hitter/pinch runner", "course designation", and "skip" unless any of them is chosen, and in response to the start of each sequence, each item is displayed in a button form shown in FIG. 17 by the image display control section 302.

The "sign" items include five sub-items for the field-taking side: "steal lookout", "hit-and-run lookout", "bunt shift", "double-play shift" and "long-hit shift", and seven sub-items for the at-bat side: "bunt", "sacrifice bunt", "hit and run", "steal (double steal)", "steal second", "steal third" and "squeeze". If a "sign" item is chosen, the contents of the sub-items thereof are displayed for a choice in each button form on the screen. Further, sub-items other than those may be employed, or another sub-item added. The "pinch hitter/pinch runner" item is executed by placing a new player card 9 to be substituted on the placement surface section 20 having the player card 9 to be replaced. If the player cards 9 are exchanged, the player parameter corresponding to player identification data newly read by the imaging section 11 is read from the ROM 330 and used in the game.

The "course designation" item gives an instruction for a pitch position when the player is a pitcher and an instruction for a bat-swing position when it is a batter.

In terms of the instructions for such positions, a regional image, for example, having a predetermined shape or typically a quadrangle, which expresses the strike zone virtually (for convenience, below called the strike-zone image SZ) over the home plate in the game space is displayed, preferably in semi-transparent form by the image display control section 302, and a desired position inside of the strike-zone image SZ on the touch panel 10 superimposed on the monitor 3 is pressed to thereby give an instruction for each position.

Figure 17:
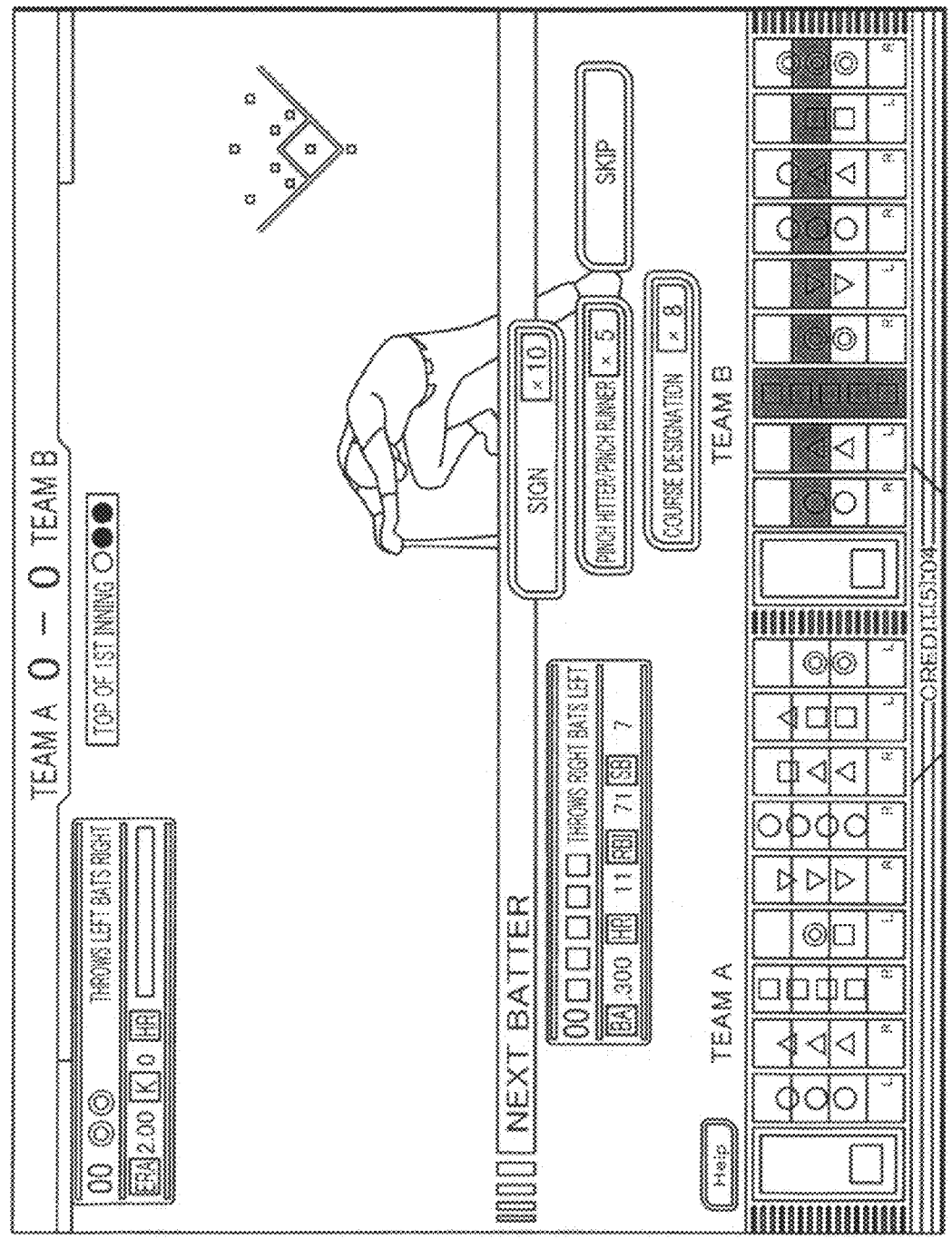
FIG. 17 shows a game image on the batter side when a sequence starts.
Figure 18:
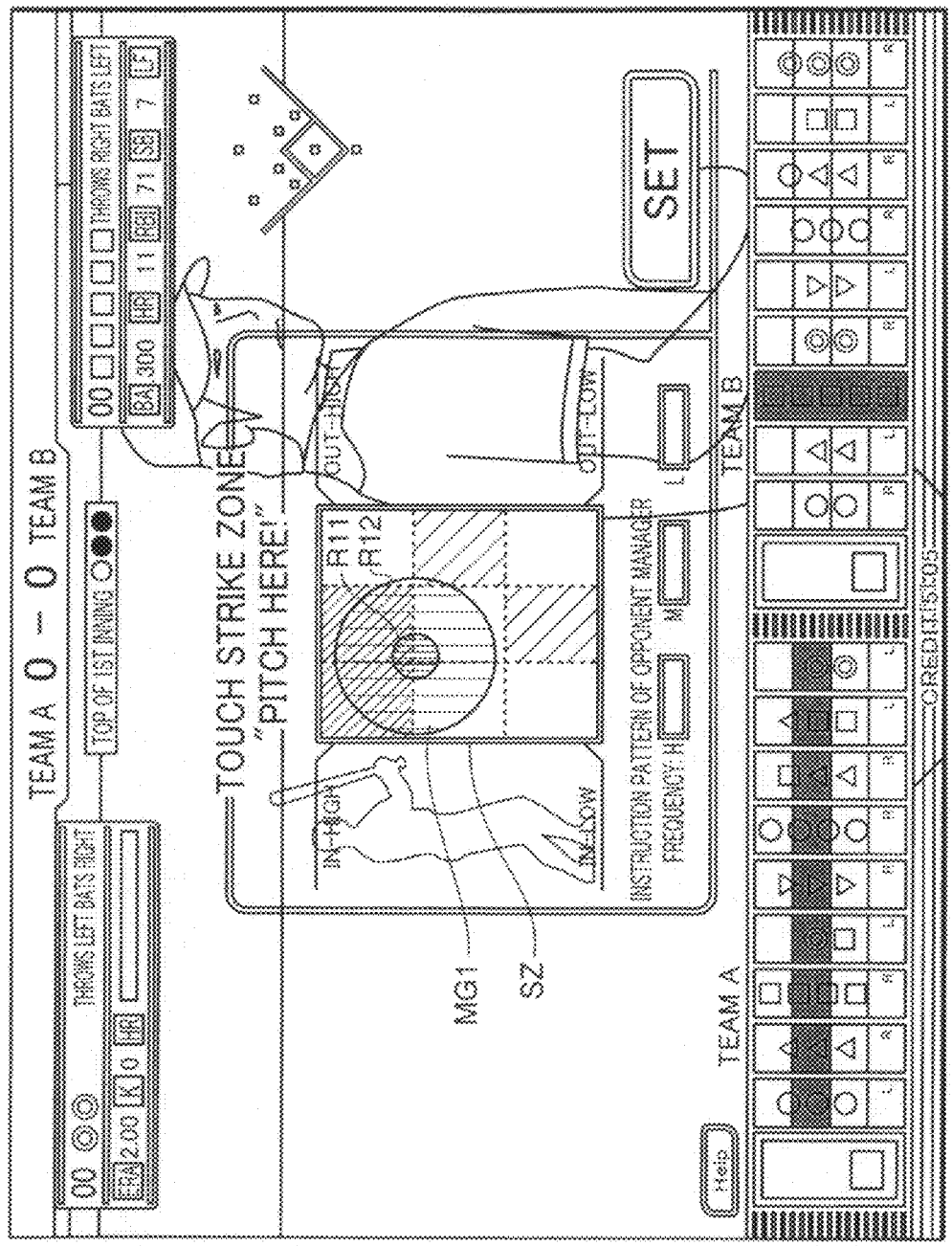
FIG. 18 shows a game image on the pitcher side to give an instruction for a pitch position.
Figure 19:
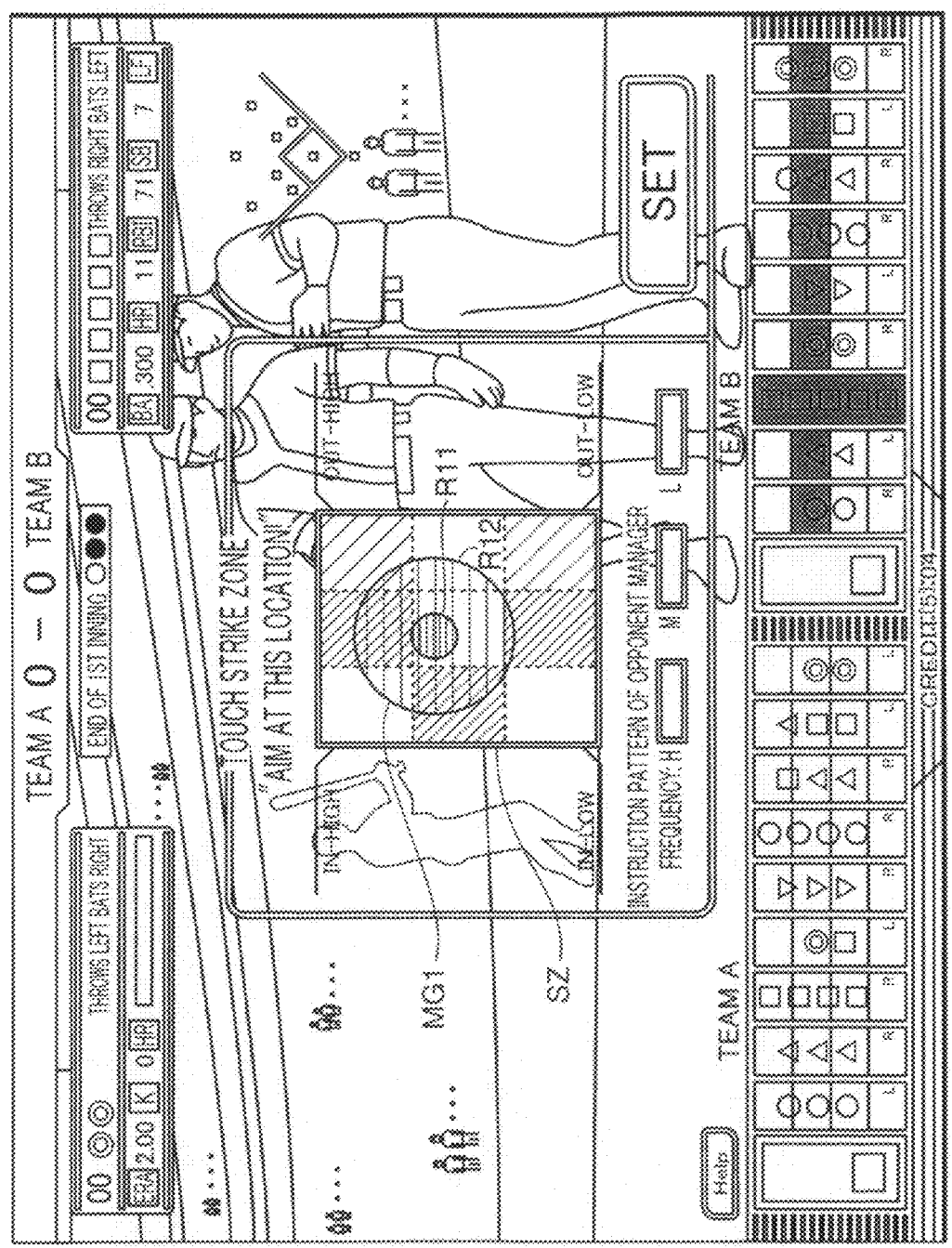
FIG. 19 shows a game image on the batter side to give an instruction for a bat-swing position.

If the "course designation" button of FIG. 17 is pressed, the image display control section 302 displays the strike-zone image SZ for designating a pitch position shown in FIG. 18 when the self-character is on the field-taking side and displays the strike-zone image SZ for designating a bat-swing position shown in FIG. 19 when it is on the at-bat side. Every time each such position is designated, the images shown in FIGS. 18, 19 and 20 to 22 are displayed to thereby check the designated positions. The setting section 304 starts to operate when the "course designation" button of FIG. 17 is pressed, and determines a position on the strike-zone images SZ of FIGS. 18 and 19 pressed via the touch panel 10 of the monitor 3 by a game player. If the player is on the field-taking side, the designated position is a position which the ball character passes through within the strike-zone image SZ, and if the player is on the at-bat side, the designated position is a position which the batter character swings the bat character simulating a bat through within the strike-zone image SZ, or a bat-swing position.

Figure 20:
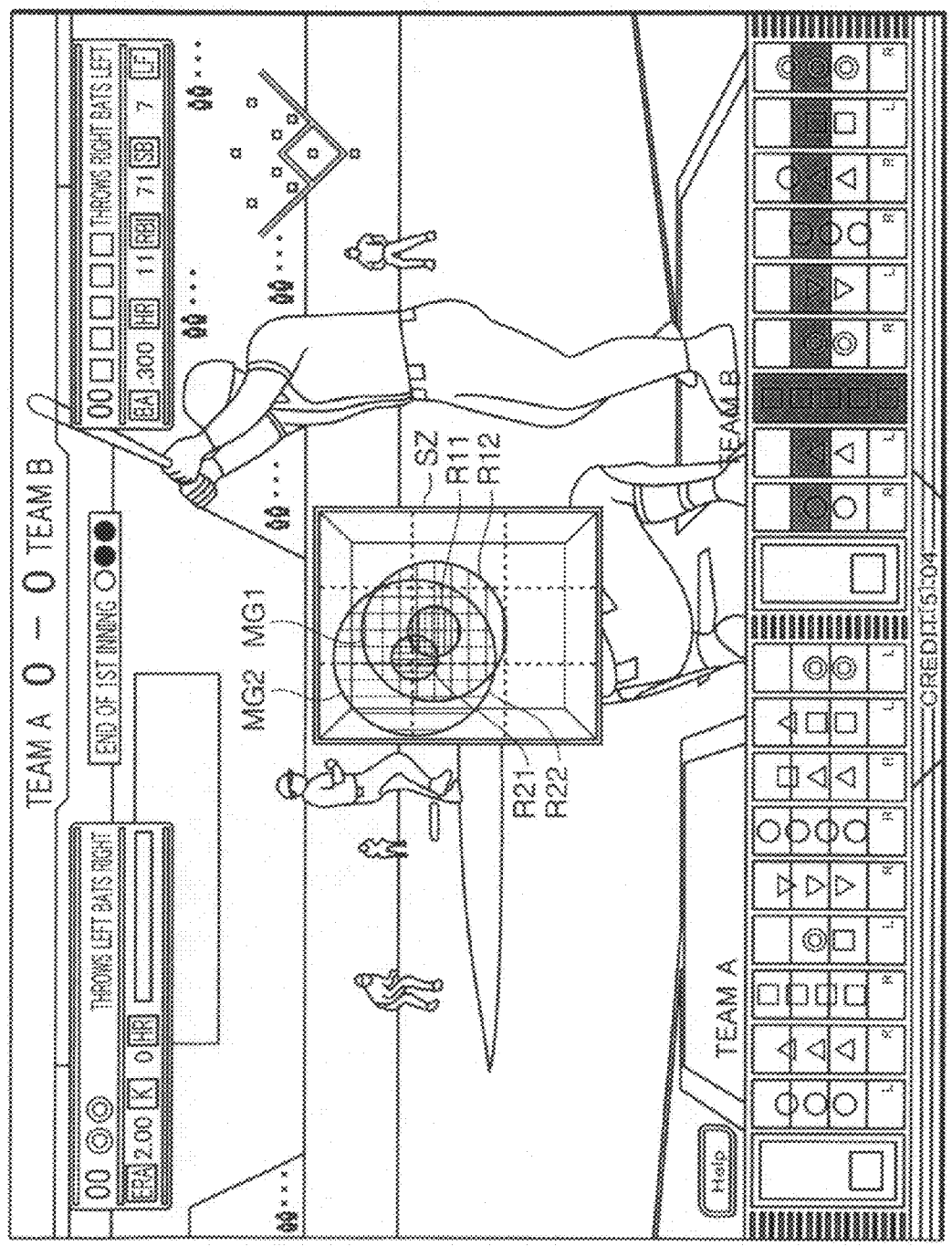
FIG. 20 shows a game image on the batter side with a pitch position overlapping with a bat-swing position.
Figure 21:
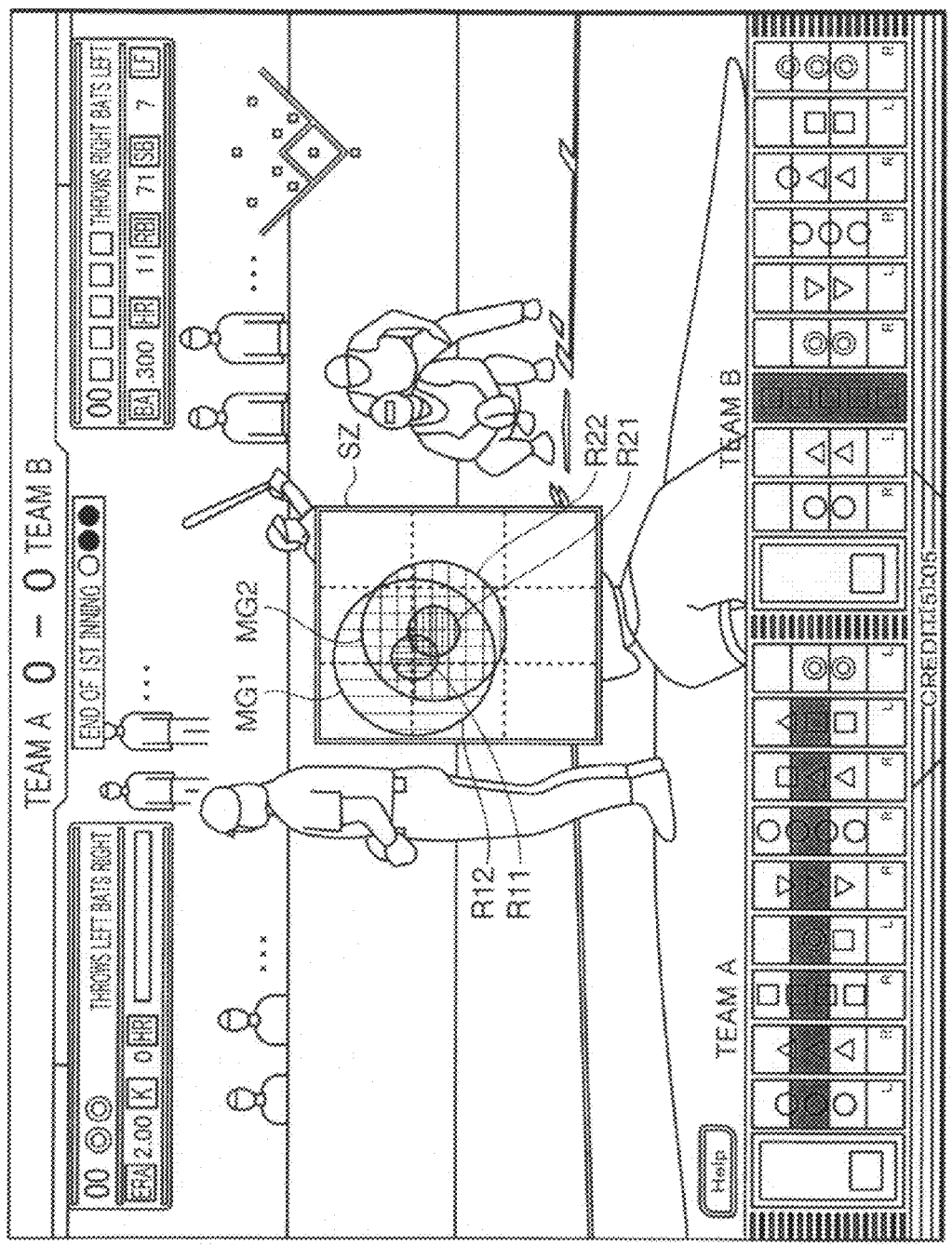
FIG. 21 shows a game image on the pitcher side with a pitch position overlapping with a bat-swing position.
Figure 22:
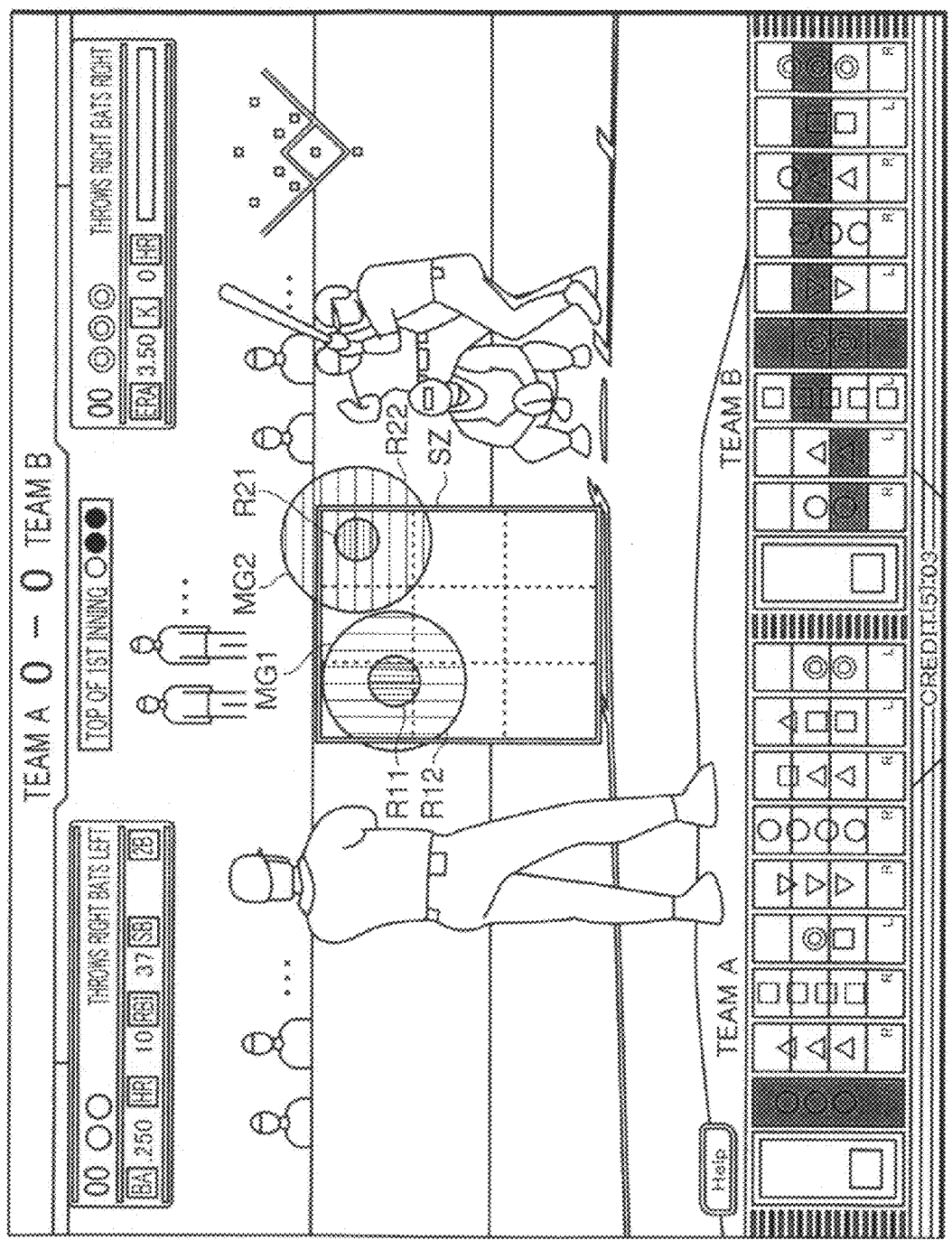
FIG. 22 shows a game image on the batter side with a pitch position not overlapping with a bat-swing position.

In addition, the setting section 304 creates a pattern having a specified shape using an instruction position given by a player as a reference, or in this embodiment, a circular pattern having a predetermined radius around the designated position as the center, and the image display control section 302 displays this as a mark image MG1 (first mark image) on the monitor 3. Likewise in the other game machine operated by the opponent player in a two-person game, the designation of a position with respect to the strike-zone image SZ is executed, and as described later, data on the designated position is received via the communicating unit 130. In the same way, the setting section 304 creates a circular pattern having a predetermined radius and the image display control section 302 displays this as a mark image MG2 (second mark image), as shown in FIGS. 20 to 22, together with the mark image MG1. The image display control section 302 displays both the mark images MG1 and MG2 after an instruction for the position of the mark image MG1 is completed (defined), thereby effectively realizing a game played by predicting (reading the next move for) an instruction position given by the opponent.

The circular pattern of each mark image MG1, MG2 may be a single circle, but in this embodiment, it is a double circle formed by an inner center-circle portion R11, R21 and an outer ring portion R12, R22, respectively, which are displayed in mutually-different display forms or typically with different colors so that they can be easily identified.

The setting section 304 sets a diameter of the center-circle portion R11 and a width of the ring portion R12 of the mark image MG1 and a diameter of the center-circle portion R21 and a width of the ring portion R22 of the mark image MG2, respectively, using parameters (ability value) as follows. As the parameters, in terms of a pitcher, elements related to the powerfulness of a pitch such as "ball speed", "overbearing", "correction against a left-handed batter" and "zipping fast ball" for the diameter of the center-circle portion R11 and elements related to the control of a pitch such as "control", "walk", "careless dangerous pitch rate" and "fast motion" for the width of the ring portion R12 are chosen from among the pitcher parameters. In terms of a batter, elements related to the power such as "power", "ballistic trajectory", "overbearing", "powerful hitter", "Sayonara game closing", "withstanding adversity", "multi-hits making", "tackle", "number-4 batter" and "number-4 batter" for the diameter of the center-circle portion R11 and elements related to the meeting of a ball such as "ball meeting", "ball meeting against a left-handed pitcher", "chance", "hitting to the opposite field", "hitting over a wide angle", "infield hit", "bunt", "bases full", "first pitch", "bits in a row" and "holdout" for the width of the ring portion R12 are chosen from among the fielder parameters. It is a matter of course that elements (parameters) other than the above parameters may be employed or added.

In the case of a pitcher character, the larger the total parameter value of elements related to the pitch powerfulness becomes, the shorter the radius of the center-circle portion R11 (R21) becomes, and the larger the total parameter value of elements related to the pitch control becomes, the shorter the radius of the ring portion R12 (R22) becomes. In the case of a batter character, on the other hand, the larger the total parameter value of elements related to the power becomes, the longer the radius of the center-circle portion R11 (R21) becomes, and the larger the total parameter value of elements related to the ball meeting becomes, the longer the radius of the ring portion R12 (R22) becomes. Therefore, on the pitcher side, the mark image becomes smaller as the ability rises and thereby is less likely to overlap with a bat-swing position (advantageous to the pitcher) while on the batter side, the mark image becomes larger as the ability rises and thereby is more likely to overlap with a pitch position (advantageous to the batter).

Some of the parameters are applied irrelevantly to the game situation while some are related to the game situation (sequence). In the later case, for example, in a game situation (sequence) where a player on the field-taking side is against a left-handed batter, the parameter of "against a left-handed batter" is employed for the pitcher. At this time, if the "against a left-handed batter" parameter is "1", the radius of the center-circle portion R11 of the mark image MG1 is shortened. On the other hand, if a player is on the at-bat side and the game situation (sequence) is the bases full, the parameter of "bases full" is employed for the batter. At this time, if the "bases full" parameter for the batter character is "1", the width of the ring portion R12 of the mark image MG1 is broadened while if the parameter is "0", the width of the ring portion R12 remains unchanged.

In terms of the setting of a diameter of the center-circle portion R21 and a width of the ring portion R22 of the mark image MG2, when a game starts or when a player is substituted for the opponent character, the player identification data of a player card is received via the communicating unit 130, and the player parameter corresponding to the player identification data is called and used from the ROM 330. The radii of the center-circle portions R11 and R21 and the widths of the ring portions R12 and R22 of the mark images MG1 and MG2 affect how much both mark images and MG2 overlap each other. There are several cases in which the mark images and MG2 do not overlap each other at all, only the ring portions R12 and R22 overlap each other, the center-circle portion R11 (or R21) of either of the ring portions R12 and R22 overlaps with the ring portion R12 (or R22), and the center-circle portions R11 and R21 overlap each other. Each overlapping degree is reflected in a batting result, which will be described later with reference to FIGS. 8, 9 and 10.

The ability-value calculating section 305 converts a predetermined ability value for a player parameter of a player card used in a game, using a conversion value transmitted from the server device 400 and stored in the RAM 340, associates the ability value after the conversion with the player character, and updates and writes it in a specified region of the RAM 340. In referring to the ability value of the player character used during the game, the setting section 304 always reads and uses the ability value from the region having the ability value after the conversion inside of the RAM 340 for the player character.

The motion setting section 306 creates input-operation information from the operating section 10A and information necessary for determining a batting result from a part of the player parameters, in other words, data transmitted to the opponent game machine in accordance with the selection items of FIG. 17. Among the pieces of information inputted from the operating section 10A, in order to set a motion of the player character virtually on how the motion should be made, information on a card placement position from the imaging section 11 is reflected upon the determination of a plurality of levels of an attribute in which those levels are set for the motion aspect.

The attribute levels are a (pitching-power) level at which a pitcher pitches with the whole or a part of the might and a power (bat-swing power) level at which a batter swings a bat. Specifically, as the attribute levels, in the case of a pitcher, if the player card 9 is on the front side from the middle of the placement surface, the pitcher throws the ball at higher speed with more might while having a lower pitch-to-be-met rate and exhausting more physical energy. In contrast, if it is on the rear side, the pitcher saves (lowers) the ball speed while having a higher pitch-to-be-met rate and exhausting less energy. The amount of exhausted physical energy is managed in advance, and the physical energy increases while sitting on the bench during the at bat. The physical energy of a pitcher decreases gradually by a preset amount according to the greatness of pitching power.

In the case of a batter, if the player card 9 is on the front side from the middle of the placement surface, the batter swings the bat at higher speed with more power while having a lower meeting rate and exhausting more physical energy. In contrast, if it is on the rear side, the batter swings the bat at lower speed with less power while having a higher meeting rate. The amount of the batter power is reflected on the flying distance and speed of a batted ball, and the ballistic trajectory or vertical angle of the batted ball, and a hit rate.

If the "sign" (command) button of FIG. 17 is chosen and any sub-item is chosen on the field-taking or at-bat side, the motion setting section 306 allows the receiving section 303 to accept the selection contents to define the selection contents as a command selection result. The command selection result is reflected upon a shift in the fielding position of a fielder or the base running of a runner in simulated baseball (according to a control program for the baseball rules) by the unit-sequence executing section 311 (described later).

As data for transmission in this embodiment, the motion setting section 306 generates as pitching data: "release timing", "kind of a pitch", "selected command item", "pitch position" and "attribute level (full to saved might)"; and as batting data: "bat-swing timing", "selected command item", "bat-swing position" and "attribute level (fast bat swing to ball meeting)". In terms of the pitching data, the "release timing" is set as a shift from the "release" (best release timing) of the pitcher parameters through a random processing by the random-number generating section 316; the "kind of a pitch" is set in consideration of the command information and the attribute level from the variety of non-straight pitches among the pitcher parameters; the "pitch position" and the "bat-swing timing" are set based on both pitcher and batter parameters in a CPU unless the "course designation" button is chosen on the image of FIG. 17. In terms of the batting data, the "bat-swing timing" is set as a shift from the "bat-swing timing" (best bat-swing timing) of the fielder parameters through a random processing by the random-number generating section 316. If the receiving section 303 or the motion setting section 306 (corresponding to an operation judging means) judges that all the items as well as the "course designation" have not been chosen within a predetermined reception period, each motion setting section 306 sets the contents of a pitch and the contents of a bat swing according to a specified rule using a pseudo-random number at each random-number generating section 316, to new ability values obtained by converting the ability values for pitcher parameters and batter parameters possessed by each game machine using the conversion value, and transmits this result as operation data to the opponent game machine.

The communicating section 307 transmits specified information set by the setting section 304, the ability-value calculating section 305 and the motion setting section 306 on the basis of the selection and instruction contents from the operating section 10A, mutually to the other game machine. The ability value after the conversion obtained by the ability-value calculating section 305 may not necessarily be transmitted because the conversion value is sent to the other game machine from the server device 400, and hence, the ability value may be converted using the conversion value received from the server device 400 on the side of the other game machine. The communicating section 307 includes a buffer in each of receiving and delivering sections for transmitted and received data or at least on the reception side, and the transmitted and received data is processed via the buffers for transmission and reception. In this way, each game machine receives data from the opponent game machine and thereby can have the same information.

The batting-result setting section 308 determines a batting result, and in this embodiment, if the "course designation" button is chosen, then sets a batting result in a different manner from the other cases. Unless the "course designation" button is chosen, then using the pitcher parameter, batter parameter and mutually-exchanged data, it calculates, for example, a probability (hit-rate probability) that the batter character will make a hit, using a specified operation expression, and according to the probability (by making a hitting decision), determines a strikeout by swinging at the pitch and missing or a ballistic trajectory (batted-ball powerfulness) of the ball struck by the bat character. At this time, the amount of exhausted physical energy is also used in coefficient form.

On the other hand, if the "course designation" button is chosen, the batting-result setting section 308 makes a hitting decision corresponding to the "course designation", and as described later, the hitting decision is made by determining a hitting level and a hitting percentage (%) based upon how much the mark images MG1 and MG2 overlap each other.

Figure 8A:
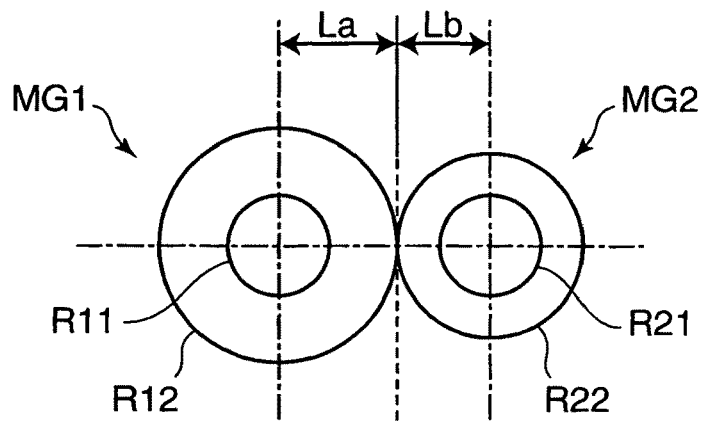
FIGS. 8A to 8C show overlapping degrees of a center-circle portion R11 and an outer ring portion R12 of a mark image.
Figure 8B:
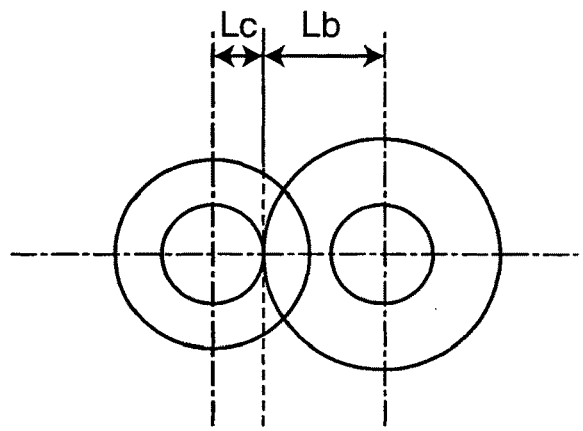
Figure 8C:
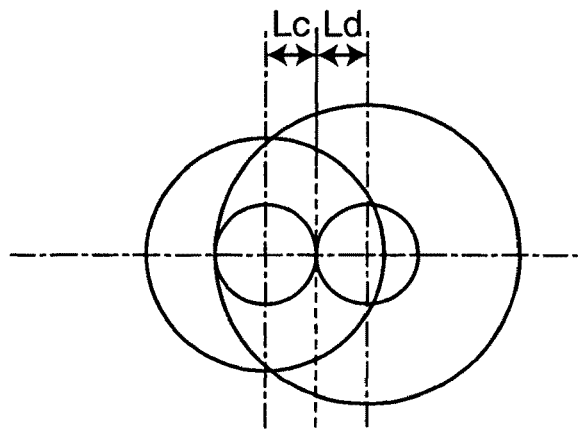

FIGS. 8A to 8C show overlapping degrees of a center-circle portion R11 and an outer ring portion R12 of a mark image. FIG. 9 is a flow chart for determining hitting levels for the overlapping degrees. FIG. 8A shows the ring portions R12 and R22 of the mark images MG1 and MG2r in contact with each other, FIG. 8B shows the outer circumference of the center-circle portion R11 of the mark image MG1 and the outer circumference of the ring portion R22 of the mark image MG2 in contact with each other and FIG. 8C shows the center-circle portions R11 and R21 of the mark images MG1 and MG2 in contact with each other. In FIGS. 8A to 8C, the radii from the centers of the mark images MG1 and MG2 to the outer circumferences of the ring portions R12 and R22 are La and Lb, respectively, and the radius of the center-circle portion R11 on one side (herein, the mark image MG1) is Lc while the radius of the center-circle portion R21 on the other side (herein, the mark image MG2) is Ld.

In FIG. 9, first, a decision is made whether the distance between the centers of the mark images MG1 and MG2 is longer than (La+Lb) (step S1). If it is longer, then there is no overlap, thereby setting a strikeout by swinging at the pitch and missing as a batting result (step S3). On the other hand, it the distance between the centers is (La+Lb) or shorter, next, a decision is made whether the distance between the centers is longer than (Lb+Lc) (step S5). If it is longer, then they are in a state between FIG. 8A and FIG. 8B, thereby setting a level-1 hitting as the batting result (step S7). On the other hand, it the distance between the centers is (Lb+Lc) or shorter, next, a decision is made whether the distance between the centers is longer than (Lc+Ld) (step S9). If it is longer, then they are in a state between FIG. 8B and FIG. 8C, thereby setting a level-2 hitting more advantageous to the batter than the level-1 hitting, for example, giving a faster batted-ball as the batting result (step S11). On the other hand, it the distance between the centers is (Lc+Ld) or shorter, next, a decision is made whether the distance between the centers is longer than a predetermined value of substantially zero (step S13). If it is longer, then there is at least more overlap than FIG. 8C, thereby setting a level-3 hitting more advantageous to the batter than the level-2 hitting, for example, giving a faster batted-ball as the batting result (step S15). Lastly, if the distance between the centers is the predetermined value of substantially zero or shorter (i.e., the centers substantially coincide), then typically, a home run more advantageous to the batter than the level-3 hitting is set as the batting result (step S17).

The batting-result setting section 308 determines a batting result based upon the hitting-level value determined in FIG. 9 and the hitting percentage (%) corresponding to the overlapping degree of the mark images MG1 and MG2 at each level when the "course designation" is chosen.

The hitting percentage (%) corresponding to the overlapping degree of the mark images MG1 and MG2 at each level will be described with reference to FIGS. 8A to 8C. In a level-1 aspect where only the ring portions R12 and R22 overlap each other as shown from FIG. 8A to FIG. 8B, if the distance between the centers is Lo, a percentage value corresponding to an overlapping degree can be calculated using $100 \times ((La+Lb)-Lo)/((Lo-(Lc+Ld))$. Hence, the state of FIG. 8A is 0% and the state of FIG. 8B is 100%. In the case where the mark images MG1 and MG2 have the same shape, if the ring portion R12 is in contact with the center-circle portion R21 on the other side, then simultaneously, the ring portion R22 is in contact with the center-circle portion R11 on the other side, which is processed as 100%. In the case where the mark images MG1 and MG2 have a mutually different shape, for example, even if the ring portion R12 is in contact with the center-circle portion R21 on the other side, the ring portion R22 is out of contact with the center-circle portion R11 on the other side, which is processed as less than 100%.

In a level-2 aspect where the ring portion R12, R22 at least on one side is in contact with the center-circle portion R21, R11 on the other side, respectively, as shown from FIG. 8B to FIG. 8C, if La>Lb and the distance between the centers is Lo, a percentage value corresponding to an overlapping degree can be calculated using $100 \times ((La+Ld)-Lo)/(La-Lc)$. Hence, the state of FIG. 8B is 0% and the state of FIG. 8C is 100%.

In a level-3 aspect where they overlapped each other in such a way that the reference positions coincide from the state of FIG. 8C, if the distance between the centers is Lo, a percentage value corresponding to an overlapping degree can be calculated using $100 \times ((Lc+Ld)-Lo)/(Lc+Ld)$. Hence, the state of FIG. 8B is 0% and the state of FIG. 8C is 100%.

Hence, each level 1, 2, 3 indicates by percentages how much the batter hits the pitched ball character with the center of the bat character. In addition, at each level, the bat-center ball-hitting degree is set continuously or gradually (with more grades than the three grades of the levels 1, 2 and 3) according to the mark-image overlapping degree, thereby enabling players to feel as if they were playing a real baseball game. For example, when the level indicates a power rate (0 to 100%) for determining a ballistic trajectory (batted-ball speed) after the ball is hit with the bat, for example, let's assume that the level 1 is 20 to 40%, the level 2 is 50 to 70% and the level 3 is 80 to 100%. If the mark-image overlapping degree is 50% at the level 1, the speed of a ballistic trajectory is set to 30%, thereby giving the hit ball character a ballistic trajectory (batted-ball speed) equal to 30% of the batting power possessed by this character. These levels reflect not proportionally but gradually as a whole upon the batted-ball speed.

Figure 10:
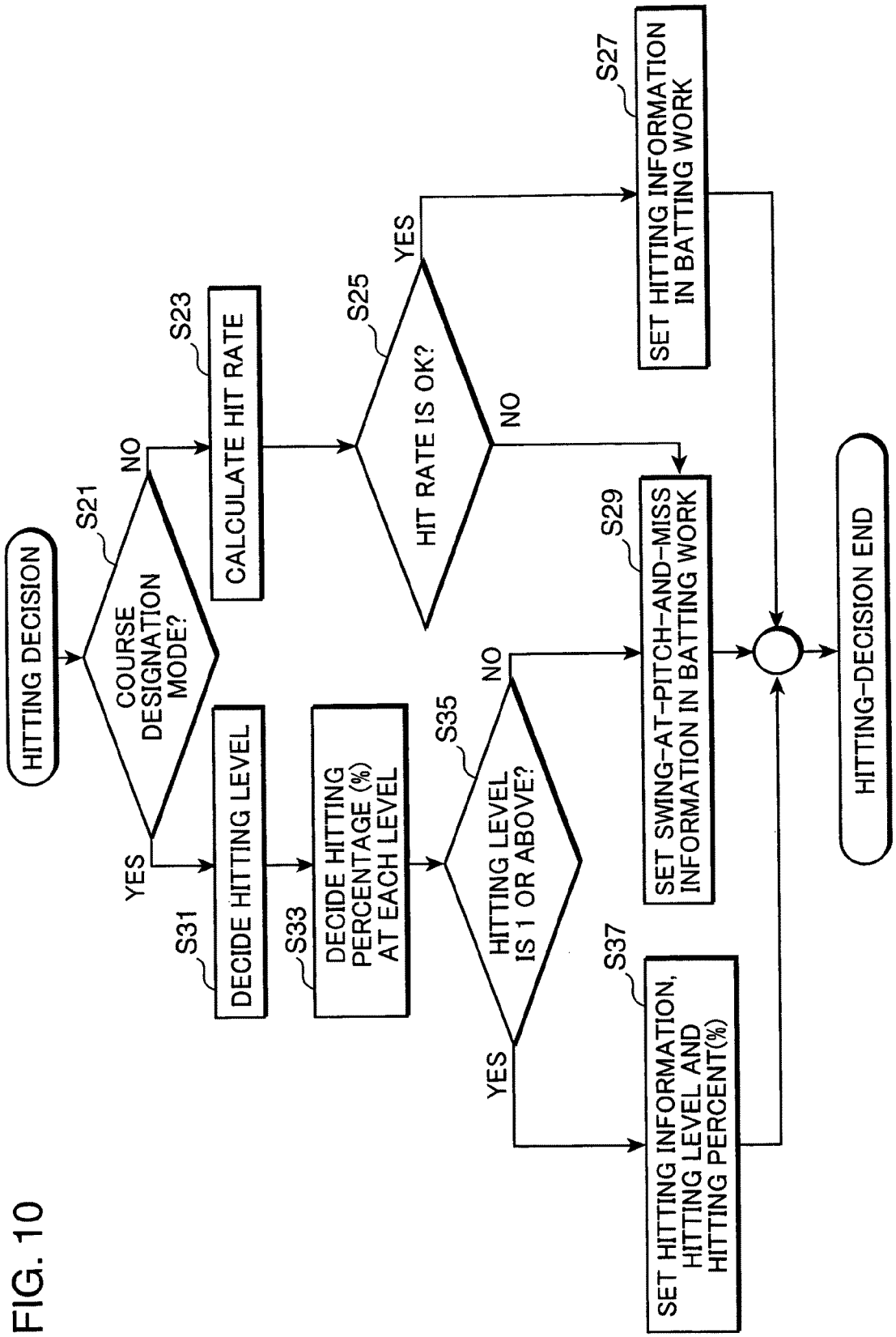
FIG. 10 is a flow chart showing a hitting decision processing.
Figure 15:
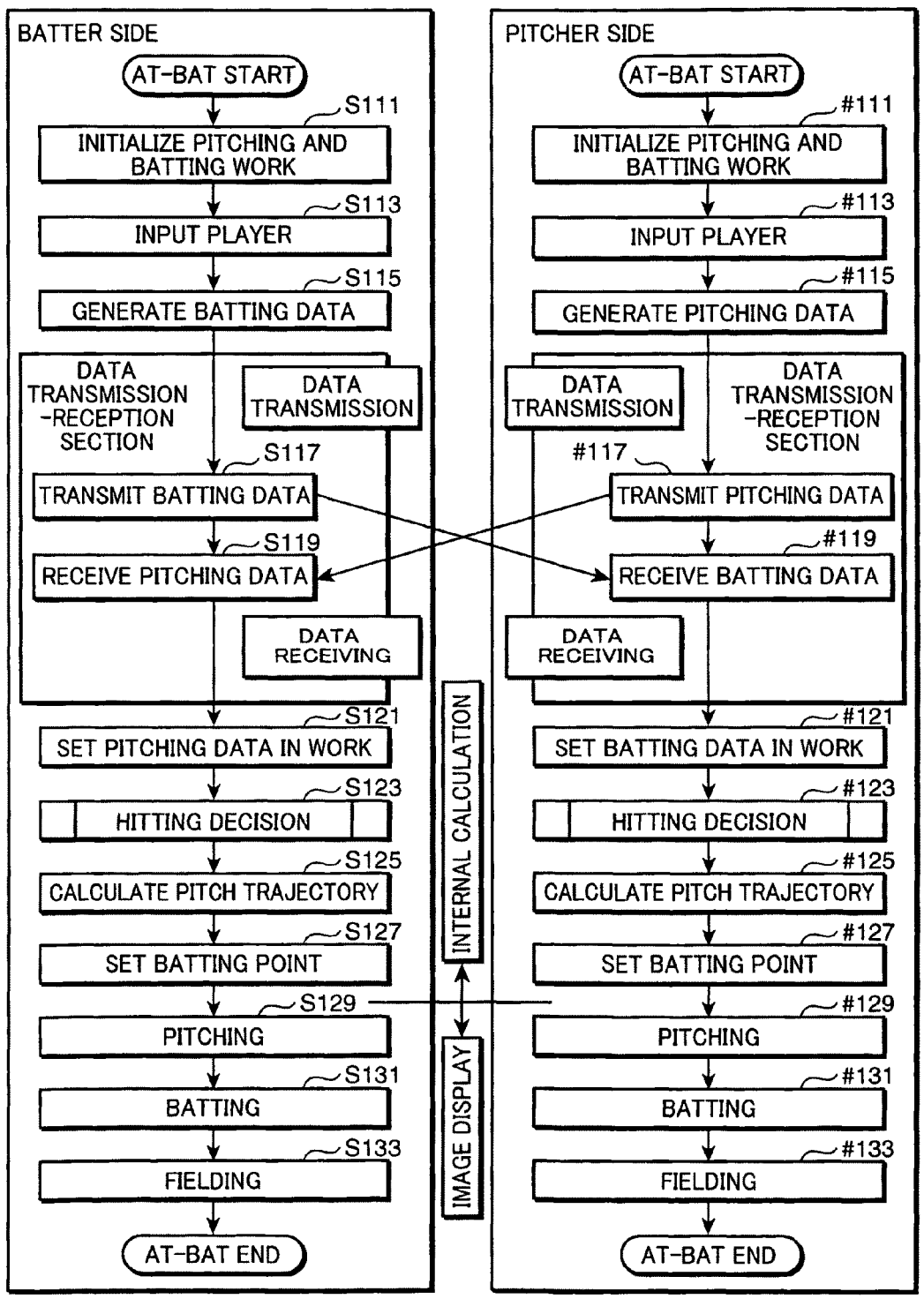
FIG. 15 is a flow chart showing a procedure for an at-bat flow included in a sequence execution processing of a step S45.

FIG. 10 is a flow chart showing a hitting decision processing (the details of a step S123 of FIG. 15). In the figure, a decision is made whether the "course designation" button is chosen on the image of FIG. 17, and if it is not chosen, the processing goes to a step S23 and an ordinary hit-rate calculation is made there. Specifically, as described earlier, using an ability value after a conversion for a pitcher parameter and a batter parameter and mutually-exchanged data or the like, a probability (hit-rate probability) that the batter character will make a hit is calculated using a specified operation expression, and a decision is made whether the calculated probability (hit rate) is a predetermined value or above (step S25). If it has reached the predetermined value, a hitting processing according to the hit rate is set in the batting work inside of the RAM 340 (step S27) while if it has not reached the predetermined value, a processing for a strikeout by swinging at the pitch and missing is set in the batting work inside of the RAM 340 (step 529).

On the other hand, if the "course designation" button is chosen on the image of FIG. 17, a hitting-level decision (step S31) and a hitting-percentage (%) decision (step S33) are made, and thereafter, a decision is made whether the hitting level is the level 1 or above (step S35). If it has not reached the level 1, a processing for a strikeout by swinging at the pitch and missing is set in the batting work inside of the RAM 340 (step S29) while if it has reached the level 1, each piece of information of the hitting information, the hitting level and the hitting percentage (%) is set in the batting work inside of the RAM 340 (step S37).

The frequency calculating section 309 functions if the "course designation" button is chosen, and as shown in FIGS. 17 and 18, divides the region of the strike-zone image SZ lengthwise and crosswise into nine areas and displays each area in a preset display form according to the frequency of position instructions from the past history, or herein, by specified grades in such a way that they become reddish as the frequency rises and preferably in semi-transparent form. In this case, the number of the areas is nine, and hence, the frequency-range rate may be divided by a predetermined width, for example, the three grades of 0 to 10%, 11 to 20% and 21% or above, or the four grades including 31% or above. Alternatively, it may be appreciated that they are guided in the order of the frequency, or only areas having a frequency of a predetermined value or above is displayed in a display form different from the other areas. Information on the frequency of positional designations is obtained by totalizing for each area all the pieces of designated-position data in the past games (or a predetermined number of recent games) by the player which are stored in the center server, and calculating a ratio thereof to the whole number. Further, instead of all the areas, in specified directions, for example, the frequency of positional instructions for the three positions of high, middle and low in the vertical directions may be displayed by predetermined grades in the above preset display form.

The game-situation judging section 310 has a game managing function of managing the situation of a game. It exchanges the player parameters of each player card 9 mutually used in starting a game, and when a player character is substituted, transmits and receives the player parameters of the player. Further, it judges a game situation (scored runs, clutch, chance or the like) from the number of sequence executions, or if it is baseball, the number of innings and the number of outs, or the execution result of each sequence until immediately before. This result is reflected upon the batting result determined by the batting-result setting section 308 or the processing for determining a hit or an out in a preset special situation (e.g., the final inning and the like) or a notable situation (the bases full or the like). If the "course designation" button is chosen, they may be used as a parameter for setting, for example, widths for the ring portions R12 and R22 of mark images, thereby making the game more interesting. If the "course designation" item is chosen, the game-situation judging section 310 associates data on a pitch position or a bat-swing position with the player and transmits it as history data to the center server.

The image display control section 302 may make the display image on the pitcher side and the display image on the batter side one and the same image (make the eye point and the line-of-sight direction of a virtual camera coincide). In this embodiment, however, the same event is rendered from a desired eye-point position different from each other, thereby making the game progress more visible to the players.

The unit-sequence executing section 311 calculates a motion from pitching to batting, each motion of the pitcher character, the fielder character, the batter character and the runner character until a series of motions according to a batting result and a motion of the ball character simulating the ball, one after another, and leads the successive calculation results one by one to the image display control section 302.

The unit-sequence executing section 311 is formed by a pre-processing section 312 and a subsequent processing section 313. The pre-processing section 312 obtains a processing result before a pitching motion for the ball character by the pitcher character displayed on the monitor 3, using the contents determined by the motion setting section 306 and the parameter used at that time. When the player is on the pitcher side, it calculates each piece of data on a pitch position, a ball speed (using the data on "ball speed" or "release" among the pitcher parameters), the kind of a pitch, a pitch trajectory and a pitch-passage position over the home plate. When the player is on the batter side, it calculates a bat-swing track, a result on whether the ball is hit with the bat, and if such a result that the ball is hit with the bat is obtained, then parameters of "batted-ball speed" immediately after the ball is hit with the bat, "batted-ball flying angle" and "batted-ball-speed attenuation factor". In each calculation, the pitched ball character and the bat-swing track may be calculated in consideration of general dynamics or air resistance, or calculated at a speed required for a game processing using a simulation calculation approximate to a real motion.

The subsequent processing section 313 processes an operation after a pitching motion and makes a calculation for enabling the fielder character to perform natural fielding according to the motion of the ball character or the runner character, enabling the runner character to perform natural base-running according to the motion of the ball character or the fielder character (according to a control program for the baseball rules) and moving the ball character based on data when it is hit with the bat character on the monitor 3. In accordance with the gap between the passage position of the ball character and the swing position of the bat character over the home plate or the gap in timing between both, the subsequent processing section 313 calculates a batted-ball speed and a batted-ball flying angle after the batting using the parameters of "batted-ball speed" immediately after the ball is hit with the bat, "batted-ball flying angle" and "batted-ball-speed attenuation factor" obtained by the pre-processing section 312. In this case, the random-number generating section 316 or the like disperses the batted-ball ballistic trajectory determined by "batted-ball speed" and "batted-ball flying angle", thereby improving the reality.

The subsequent processing section 313 makes the above calculations repeatedly at a predetermined period and leads the results to the image display control section 302 to thereby display each motion of the ball character, the pitcher character, the batter character, the fielder character and the runner character animatedly on the monitor 3, so that a more real sequence processing can be realized.

After the game ends, the player-card issuing section 314 gives an instruction to allow the player-card issuance slot 6 to issue a predetermined number of player cards, or one herein, from the player-card storage section inside of the frame 1, thereby enabling the player to collect the predetermined number and types of player cards in each game.

The opponent-operation setting section 315 enables, in the single game machine, a player to play a CPU two-person game, using a baseball team including the images of a required number of player characters for organizing one team and each parameter (pitcher parameter and fielder parameter) for them which is prepared beforehand in the ROM 330 and controlled by a computer, and gives a selection processing for the "course designation" item and the "sign" item and an execution processing for an attribute level, a batting result and a sequence. The opponent-operation setting section 315 enables the player to play a game basically against a virtual opponent player and allows the setting section 304 (second setting means), the ability-value calculating section 305, the motion setting section 306, the batting-result setting section 308, the frequency calculating section 309, the game-situation judging section 310 and the unit-sequence executing section 311 to function equally inside of the self-machine and executes a processing for displaying an image on a single monitor. The ability-value calculating section 305 is not applied to player characters on the computer side and exclusively converts the ability values of player characters on the player side which are opponents if seen from the computer.

As described earlier, the random-number generating section 316 generates a pseudo-random number by a predetermined rule and executes a probability processing using a pseudo-random number for the probability of setting contents a result of which is determined by the probability, or herein, "release timing" and "bat-swing timing". The random-number generating section 316 is initialized before the next game starts, when a game starts or when each sequence starts by the game processing section 301. Therefore, in playing a two-person game between two game machines, the communicating section 307 exchanges mutual data, and hence, the probability processing is executed under the same conditions or using the same data. Accordingly, both random-number generating sections 316 generate an identical pseudo-random number constantly to thereby make a processing result by each sequence coincide between both game machines. This is the same even in the case where as described later, the unit-sequence executing section 311 calculates a probability processing using a pseudo-random number, and without exchanging data using the communicating section 307, the contents of the processing in both game machines become constantly identical, thereby displaying the same game-progress image on the monitors 3 of both game machines.

FIG. 17 shows a game image on the batter side when a sequence starts. FIG. 18 shows a game image on the pitcher side to give an instruction for a pitch position. FIG. 19 shows a game image on the batter side to give an instruction for a bat-swing position. FIG. 20 shows a game image on the batter side with a pitch position overlapping with a bat-swing position. FIG. 21 shows a game image on the pitcher side with a pitch position overlapping with a bat-swing position. FIG. 22 shows a game image on the batter side with a pitch position not overlapping with a bat-swing position (swinging at the pitch and missing). As shown in FIGS. 18 to 22, on the screen of the monitor 3 are displayed a game image, as well as game players (team names) and the contents of game progress (scored runs, inning or the like) at the top, and data on the batter and the pitcher confronting each other on both sides thereof. A list of team members is displayed at the bottom of the screen and the strike-zone image SZ in the middle thereof. In this embodiment, the strike-zone image SZ is divided lengthwise and crosswise into nine areas, and in identifiable display form for each area, the frequency of positional designations set by the opponent is indicated, and the mark image MG1 on the self-side (FIGS. 18 and 19) and the mark images MG1 and MG2 on both sides (FIGS. 20 to 22) are displayed together.

Figure 11:
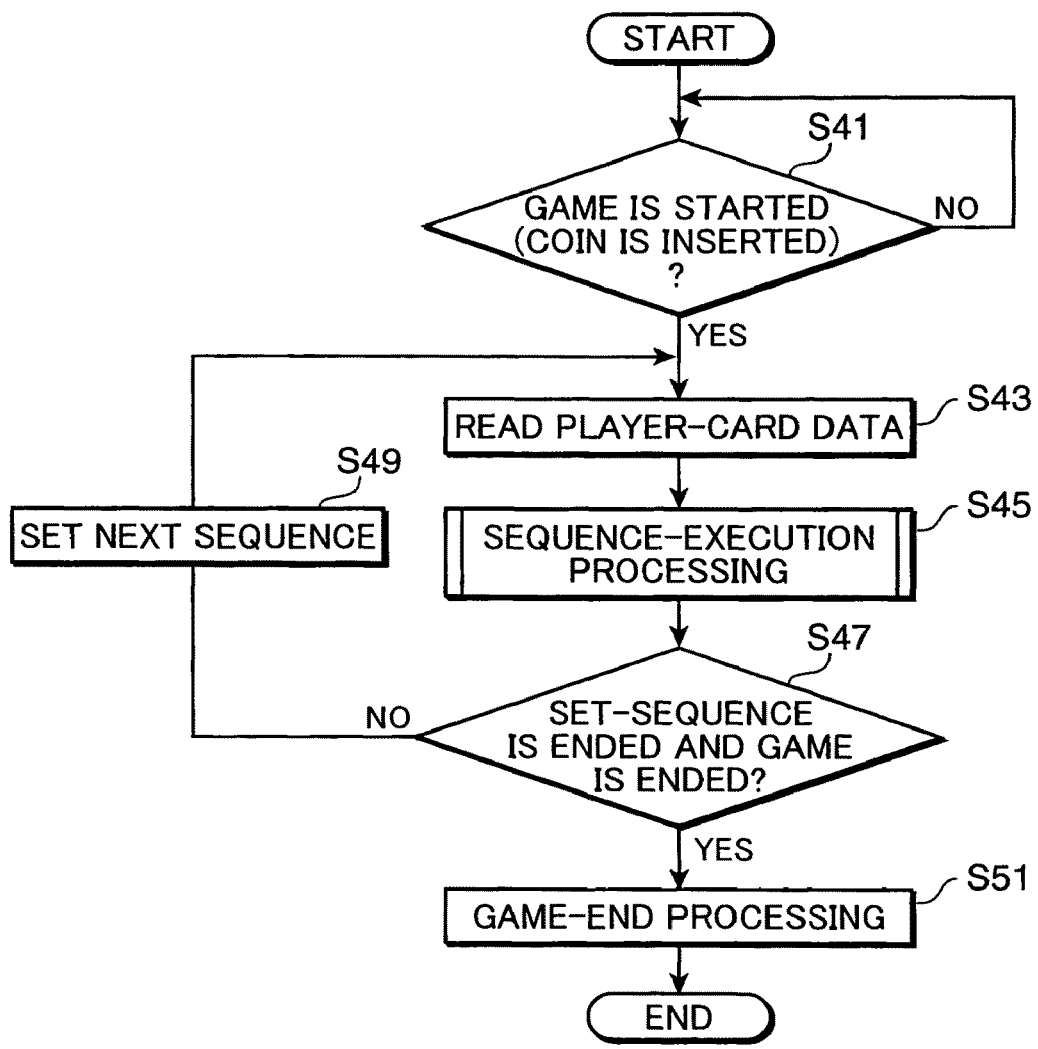
FIG. 11 is a flow chart showing the whole of a game.

FIG. 11 is a flow chart showing the whole of a game. First, if the coin sensor 81 detects a coin inserted (step S41), a game-start signal for starting a baseball game is generated and transmitted to the server device 400, then the imaging section 11 starts to operate, detects a required number of (in a baseball game, nine) player cards 9 placed on the placement surface section 20 and reads the player identification data of each player card 9 (step S43). Next, the game starts, data is exchanged between the player and the opponent, and sequentially, the processing moves to the execution of one sequence for playing one batter character (step S45). Every time the sequence ends, a decision is made whether the game should be terminated (step S47), and if any of the outs or any of the innings still remains, a sequence for playing the next batter character is set to thereby return the processing to the step S43. If the game ends at the step S47, a game-end processing (step S51) is executed, for example, for offering superiority or inferiority (winning or losing) or the like on the monitor 3, thereafter giving an instruction to issue a new player card 9 and transmitting a game-end signal for ending the two-person game to the server device 400 to thereby end the flow. Incidentally, when the game stars, both game players can exchange data, as described later, synchronously by executing a reception processing after transmitting the data.

Figure 12:
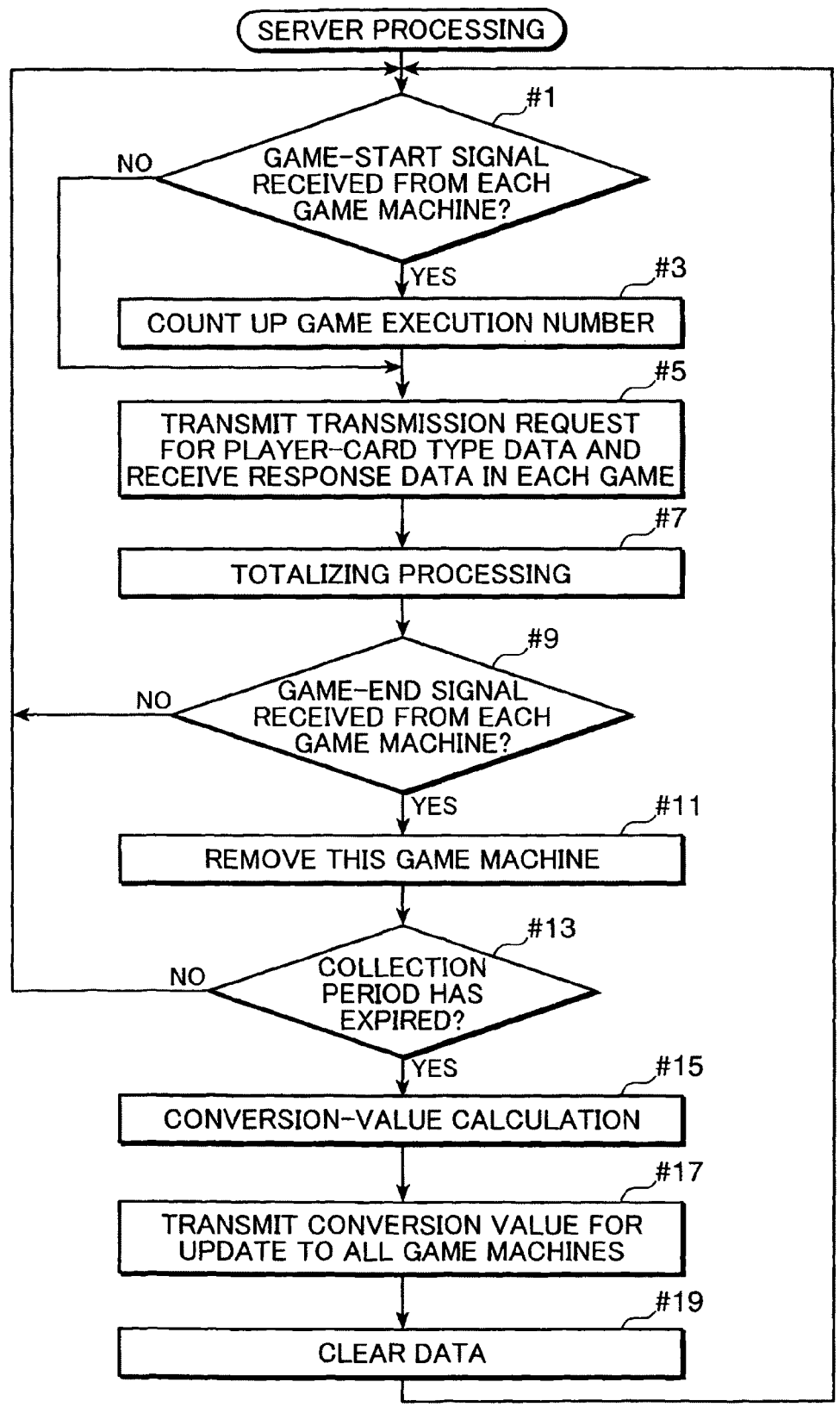
FIG. 12 is a flow chart showing a processing for a conversion value in a server device.

FIG. 12 is a flow chart showing a processing for a conversion value in a server device. First, a decision is made whether the game-start signal has been freshly received from each game machine (step #1). If the game-start signal has been received, the game execution number of a counter inside of the RAM 430 increases by one (step #3) while if not, the processing skips it. Next, a transmission request for data indicating the type of player card is transmitted to each game machine, and the type data of the player card 9 presently used from each game machine returned in response to this is received (step #5). Upon receiving the data, the server device 400 gives a cumulative addition of one to the value corresponding to the type of player card 9 newly received a totalizing storage section inside of the RAM 430 via the acquiring section 411 (step #7). In this manner, a histogram on the frequency of use of each type of player card 9 is created, and sequentially, a decision is made whether the game-end signal has been received from each game machine (step #9). If an affirmative decision is made, a processing for stopping the transmission request for a game machine about to end the game to thereby remove the game machine from the game is executed (step #11) while if the game-end signal has not been received, the processing returns to the step #1. Since the game-start signal and the game-end signal are irregularly received, preferably, they may be stored once in a buffer or the like and saved until a decision is made at the steps #3 and #9, respectively.

Next, a decision is made whether a data collection period or one day herein has expired (step #13). If it has not expired, the processing returns to the step #1 while if it has expired, then sequentially, it moves to a processing for calculating a conversion value. The processing of the steps #1 to #13 is executed at a predetermined period, and thereby, the data collection in the step #5 is repeated at the predetermined period. Therefore, even if the player card 9 is changed for a player replacement or the like in the middle of a game in a certain game machine, then because the predetermined period is suitably set, the types of both player cards before and after the change can be certainly collected.

In a step #15, using a game execution number and the frequency of use of each player card 9 (and if necessary, incorporated character) stored in the RAM 430, the use rate of each player card 9 and a conversion value for converting the ability value of a player character according to the use rate are calculated as described earlier.

Next, if it is time to update the conversion value, for example, if a first predetermined time comes the next morning, a new conversion value is distributed to all the game machines in such a way that it is associated with the type of each player card (step #17), thereby update the conversion value in each game machine. Upon finishing transmitting the new conversion value, the server device 400 clears the data, and again, shifts to the step #1 from the start of the data totalizing period.

Figure 13:
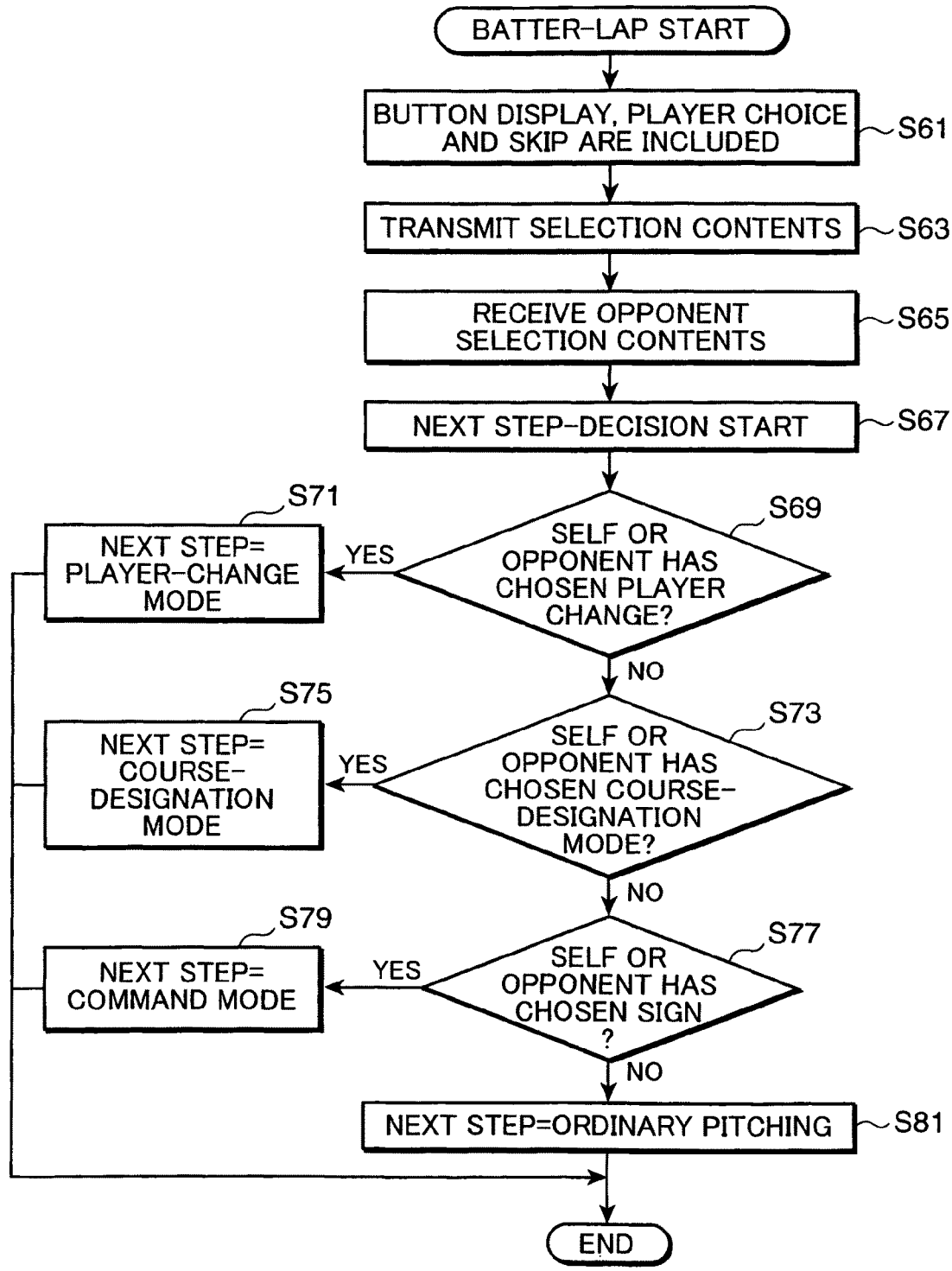
FIG. 13 is a flow chart showing a selection processing for a screen image shown in FIG. 17.

FIG. 13 is a flow chart showing a selection processing for a screen image shown in FIG. 17 indicating the start of one sequence when the next batter is preparing himself to go to the box. The screen image includes the four buttons of "sign", "pinch hitter/pinch runner", "course designation" and "skip". If the receiving section 303 accepts that any button has been chosen (step S61), it transmits selection contents to the other game machine as the opponent in the game (step S63) and receives selection contents of the opponent player from the other game machine (step S65). In the selection-contents transmission and reception processing, both players take a mutually-different length of time to make a choice, and hence, the one who has made a choice earlier may execute a transmission processing. Specifically, in the exchange of data on selection contents of both players in a two-person game, as given in steps S117 and S119 of FIG. 15 described later, a reception processing is executed after data transmission, thereby realizing a synchronous data exchange between both.

If the reception of selection contents by the opponent player is completed, next, a step decision processing is executed (step S67). Specifically, the "sign", "pinch hitter/pinch runner" and "course designation" are placed in the order of priority, and only one item can be simultaneously chosen in this embodiment. First, a decision is made whether the self-player or the opponent player has chosen the player change (pinch hitter/pinch runner) (step S69). If the choice is made, the processing shifts to a player-change mode to thereby switch the screen image to a specified image for guiding a player change (step S71). On the other hand, if the player change is not chosen, a decision is made whether the self-player or the opponent player has chosen the "course designation" (step S73). If the choice is made, the processing shifts to a "course designation" mode and thereby the screen image of FIG. 18 (or FIG. 19), further FIG. 20 (or FIG. 21), or FIG. 22 (step S75). On the other hand, if the "course designation" is not chosen, a decision is made whether the self-player or the opponent player has chosen the "sign" (step S77). If the choice is made, the processing shifts to a "sign" mode to thereby display buttons indicating the contents of various signs and switch the screen image to a specified image for prompt a choice (step S79). In contrast, if the "skip" has been chosen or if no button is chosen after a predetermined time has elapsed (NO at the step S77), a sequence processing under pitch contents and swing contents set by a computer (the motion setting section 306 and the batting-result setting section 308) and the image display for the sequence processing are executed (step S81). As described above, if the "skip" has been chosen or if none is chosen after a predetermined time has elapsed, data indicating no input operation is executed through a transmission and reception processing shown in FIG. 16 described later.

The self-player or the opponent player who are playing the game with each other choose not always the same item (button) on the screen image of FIG. 17 and may choose a different button, and hence, a priority order is set as follows. Specifically, if either player presses the "pinch hitter/pinch runner" button, then the processing moves to the "player change" mode, though the other player presses a different button. If either player presses the "course designation" button, then the processing moves to the "course designation" mode, though the other player presses the "sign" or "skip" button. If either player presses the "sign" button, then the processing moves to the "sign" mode, though the other player presses the "skip" button different from it.

Figure 14:
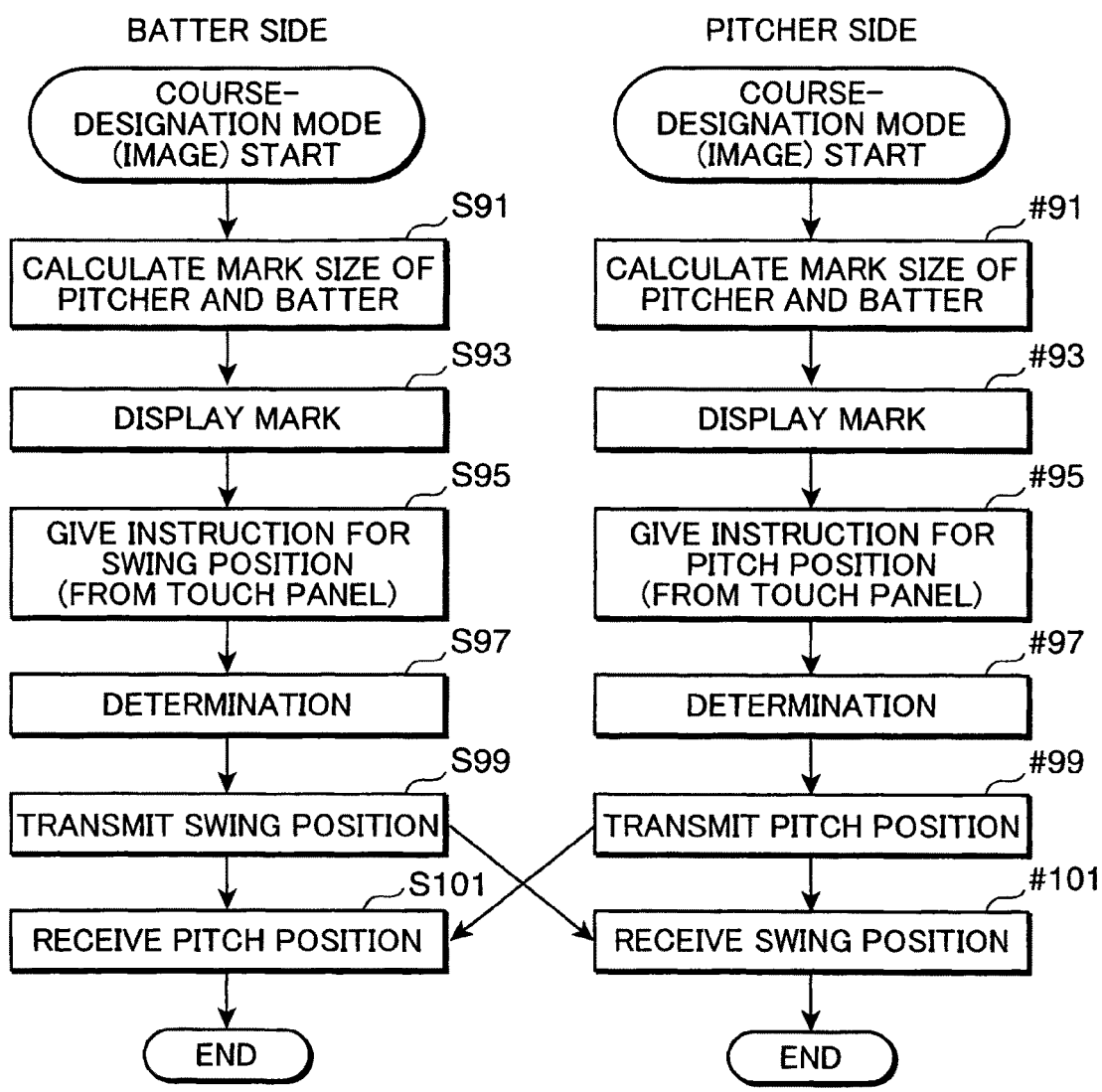
FIG. 14 is a flow chart showing a procedure for a "course designation" mode of a step S75.

FIG. 14 is a flow chart showing a procedure for the "course designation" mode chosen at the step S75 of FIG. 13. Herein, a description will be given in the case where the self-player is on the at-bat side and the opponent player is on the field-taking side. If the self-player is on the field-taking side (the opponent player is on the at-bat side), "the batter side" may be simply replaced by "the pitcher side", and hence, the description is omitted.

If the processing shifts to the "course designation" mode, a size of the mark image MG1 for the batter character, or a radius of the center-circle portion R11 and a width of the ring portion R12, are set using the ability value after the conversion, and a size of the mark image MG2 for the pitcher character as the opponent character, or a radius of the center-circle portion R21 and a width of the ring portion R22, are set using the ability value after the conversion on the opponent-character side (step S91). Next, the mark image MG1 only for the self-side or the batter side is displayed in a proper place of the strike-zone image SZ, for example, in the middle thereof (step S93). The self-player can press the touch panel 10 for a proper place of the strike-zone image SZ while viewing the mark image MG1. If the self-player presses a desired position of the strike-zone image SZ as a designated position, a processing for moving the center of the mark image MG1 to the pressed position is executed (step S95). The mark image MG1 may be moved to the designated position by dragging the mark image MG1 with pressed. After the designated position is determined, the self-player presses a determination button shown in FIG. 19 and thereby defines the swing position (step S97).

Sequentially, information on the defined swing position is transmitted to the opponent game machine via the communicating unit 130 (step S99) and information on a pitch position designated by the opponent game machine is received (step S101).

In this way, the self-side game machine refers to a pitcher parameter as the opponent character and a game situation based upon the data possessed inside of the game machine, calculates and sets the center-circle portion R21 and the ring portion R22 of the mark image MG2, receives information on the pitch position designated in the opponent game machine by the opponent player and sends it to the image display control section 302, thereby allowing the monitor 3 of the self-side game machine to display both the mark images MG1 and MG2. The mark image MG2 is not displayed on the monitor 3 in the flow chart, but for example, at the point of time when both players are confronting each other, it is displayed in the step S123 of FIG. 15. As shown in FIGS. 18 and 19, an image indicating the setting frequency of the opponent is displayed within the strike-zone image SZ. In this way, at least after the swing position is determined (defined) on the self-side, the mutual information is exchanged and the pitch position designated on the opponent side is displayed on the monitor 3, thereby designating the swing position while making a prediction or guessing intentions of the opponent only based upon the setting-frequency information of the opponent, so that a great interest can be maintained in the game.

On the other hand, in the opponent game machine operated by the opponent player on the pitcher side, a size of the mark image MG1 (the mark image MG1 from the standpoint of the game machine of the opponent player) for the pitcher character, or a radius of the center-circle portion R11 and a width of the ring portion R12, are set using the ability value after the conversion, and a size of the mark image MG2 for the batter character as the self-player character on the opponent side if seen from the opponent player, or a radius of the center-circle portion R21 and a width of the ring portion R22, are set using the ability value after the conversion on the opponent-character side (step #91). Next, the mark image MG1 only for the pitcher side is displayed in a proper place of the strike-zone image SZ, for example, in the middle thereof (step #93). The opponent player can press the touch panel 10 for a proper place of the mark image MG1 while viewing the mark image MG1. If the opponent player presses a desired position of the strike-zone image SZ as a designated position, a processing for moving the center of the mark image MG1 to the pressed position is executed (step #95). After the designated position is determined, the opponent player presses a determination button shown in FIG. 17 and thereby defines the pitch position (step #97).

Sequentially, information on the defined pitch position is transmitted to the self-side game machine via the communicating unit 130 (step #99) and information on a swing position designated by the self-side game machine is received (step #101). Specifically, in the exchange of data on designation contents of both players in a two-person game, as described later, a reception processing is executed after data transmission, thereby realizing a synchronous data exchange between both. The transmission and reception processing of the steps S99 and S101 (steps #99 and #101) may be executed together with the steps S117 and S119 (steps #117 and #119) of FIG. 15. In this embodiment, in FIG. 13, if the "skip" is chosen or if no button is chosen after the predetermined time has elapsed (NO at the step S77), both game machines allow the CPUs to create data (data on a pitch position and data on a swing position), and when the data creation is completed, execute the data exchange through the transmission and reception processing of FIG. 15.

In this way, the opponent game machine refers to a batter parameter and a game situation, sets the center-circle portion R21 and the ring portion R22 of the mark image MG2, receives information on the swing position designated in the game machine by the self-player and sends it to the image display control section 302 of the other game machine, thereby allowing the monitor 3 of the opponent game machine to display both the mark images MG1 and MG2. After the pitch position is determined on the opponent side, the mutual information is exchanged and the swing position designated on the self-side is displayed on the monitor 3, thereby designating the pitch position while making a prediction or guessing intentions of the opponent, so that a great interest can be maintained in the game.

FIG. 15 is a flow chart showing a procedure for an at-bat flow included in a sequence execution processing shown in the step S45 of FIG. 11. First, a description will be given in the case where the player is on the batter side, and since the same is basically applied even if the player is on the pitcher side, only a part of the procedure different from the case of the batter will be described.

First, the data on a pitching and batting processing (work) executed in the sequence immediately before is initialized (step S111), and then, a processing for receiving a selection result for the "sign" item or the like by the player or the like is executed (step S113). This player-input reception processing is also used for data on the position of the player card 9 on the placement surface section 20. If a choice or the like is not made for all the items and if no change is made in the position data of the player card 9 on the placement surface section 20 (which can be judged by collating it with the position data in the sequence immediately before), then the fact of no operation for a choice or the like is received as an operation result. The same is applied to the case where the "skip" button (FIG. 17) is pressed.

If a player input is received, batting data to be transmitted to the opponent game machine is generated (step S115). The batting data is transmitted to the opponent game machine (step S117) and pitching data transmitted from the opponent game machine is received (step S119). This transmission and reception operation is designed to be executed after a predetermined time necessary for the player to determine an operation passes from the point of time when the batting flow starts, thereby enabling both game machines to transmit the data almost at the same time.

Figure 16:
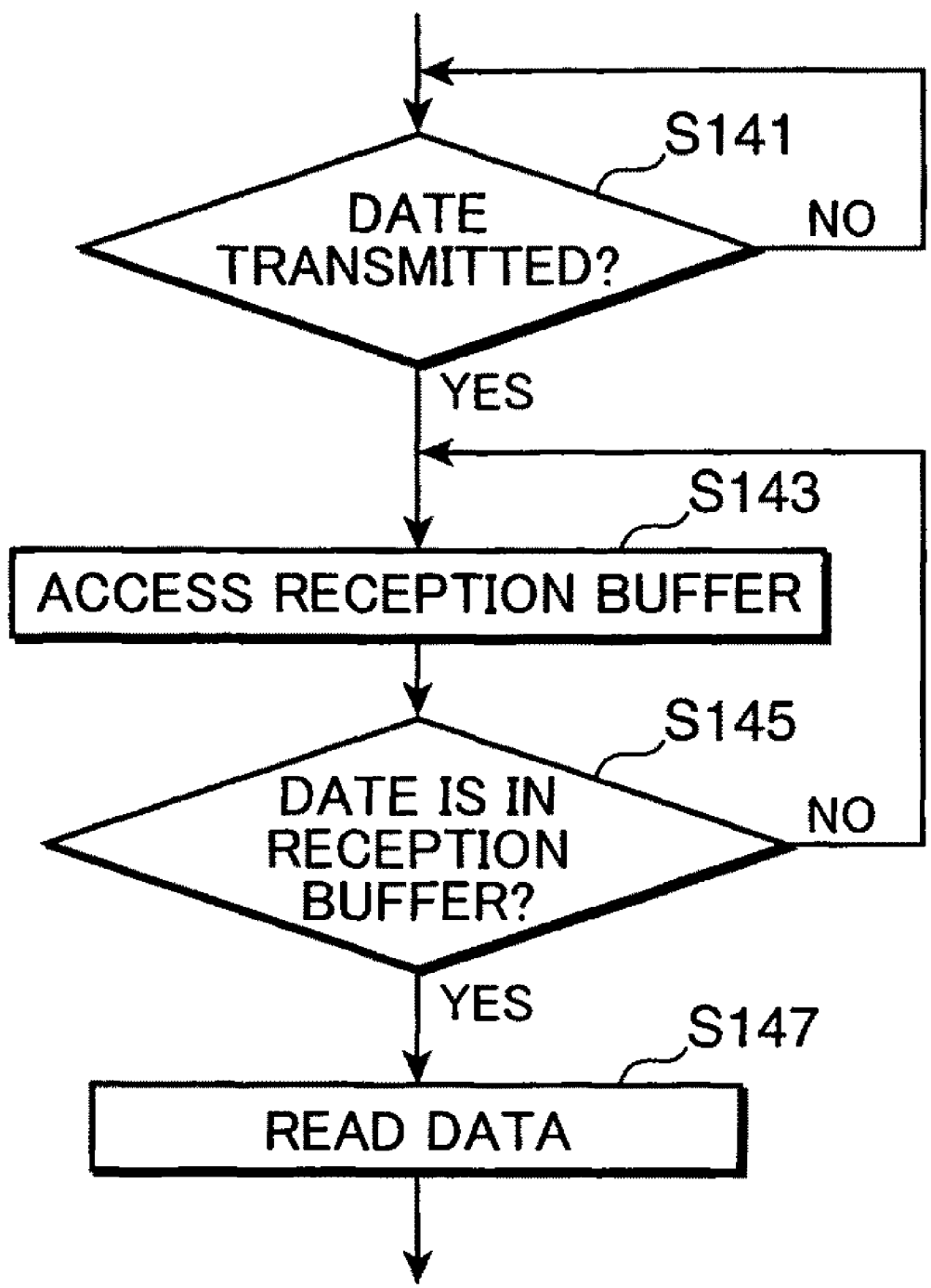
FIG. 16 is a flow chart showing in detail an example of data transmission and reception.

FIG. 16 is a flow chart showing in detail an example of data transmission and reception. Using the communicating section 307, each game machine is capable of data reception into a reception buffer through a mutual interruption processing, and after data is created, transmits the created data instantly to the other game machine. Upon completing the data transmission processing from the self-game machine (YES at a step S141), the communicating section 307 accesses the reception buffer to acquire the received data periodically, for example, in each unit of 1/60 seconds (step S143) and thereby reads the received data into the machine from the reception buffer after the data transmission (steps S145 and S147). The access and data acquisition are executed as follows. A rule that for data to be given and received, for example, the head thereof includes specified code data or the like, or another such rule, is made in advance, then a decision is made whether there is the code data for each access, and if there is the code data, the data inside of the reception buffer as the data from the opponent game machine is read into the self-game machine. This allows the batting-result setting sections 308 of both game machines to acquire and process the self-side data and the opponent data constantly at the same time.

In addition, for example, when the "course designation" mode is chosen in FIG. 13, if no input operation is executed for the opponent game machine, then at the point of time when a preset input reception time has elapsed, data on a pitch or swing position automatically generated by the CPU of the opponent game machine is transmitted. Then, the self-game machine repeats NO at the steps S143 and S145, finally reads the data transmitted from the opponent game machine which has been received by the reception buffer and as described previously, creates data for the two-person game and makes a hitting decision. After transmitting the data, the opponent game machine becomes accessible (permitted) to the reception buffer and acquires data on a swing or pitch position sent in. The same processing is executed even when no input operation is executed for the self-game machine. In FIG. 13, if the "skip" has been chosen or if no button is chosen after the input reception time has elapsed, each CPU creates data (pitching data and batting data), and in response to completion of the data creation, the data exchange is made through the transmission and reception processing of FIG. 16. Further, for example, even when the "course designation" mode has been chosen, if no input operation is executed for both game machines, each CPU creates data (data on the pitch position and data on the swing position), and in response to completion of the data creation, the data exchange is made through the transmission and reception processing of FIG. 16, thereby creating data for the two-person game and making a hitting decision.

At the point of time when the preset input reception time has elapsed, each game machine may transmit data and then read data transmitted from the other game machine which is received by each reception buffer.

In this way, when an input is operated in a mutual game machine, even if no input operation is executed for at least on game machine, the data exchange is made, thereby giving the same pitching data and batting data to each game machine. Since both game machines have the same data, no time lag is produced when both display images, thereby enabling both players to play a game without feeling that something is wrong and evenly in communication.

Next, the received pitching data is saved in the work area of the RAM 340 (step S121) and the batting-result setting section 308 makes a hitting decision using the pitching data, batting data and the like (step S123). The processing for an ordinary mode (including the case where only the "sign (command)" item is chosen) is executed in the hitting decision.

In a step S125, a pitch trajectory is calculated using the pitching data, and then, a "batting point" as the passage position over the home plate obtained in the pitch-trajectory calculation is set (saved) in the work area (step S127). Next, an image of "pitching" as a pitching motion and a pitching processing is displayed on the monitor 3 according to the result obtained in the pitch-trajectory calculation (step S129). Then, an image of "batting" as a batting motion and a batting processing is displayed on the monitor 3 according to swing timing, a batted-ball direction and a batted-ball speed as a batting result obtained in a calculation (step S131). In response to the batting result, each move of the fielder character, the runner character and the ball character is calculated one after another and displayed as an image on the monitor 3 (step S133).

When the player is on the pitcher side, the processing of steps #111 to #133 is executed synchronously with the processing of the steps S111 to S133, respectively. In addition, the pitching data is transmitted in a step #117 and the batting data is transmitted in a step #119, and hence, the game is temporarily halted while both game machines are executing a data transmission and reception (data exchange), and the game is resumed every time the data transmission and reception is completed, thereby advancing the game.

The present invention includes the following aspects.

(1) In this embodiment, the overlapping degree of the mark images MG1 and MG2 based on the player parameters is reflected upon a game result; the present invention is not limited to this, however. A variety of methods can be adopted so long as various ability values for player parameters of each player character are reflected upon a game result, in other words, as long as a player character having higher ability values is designed to have an advantage in respect of probability over a player character having lower ability values.

(2) The touch panel 10 as an operating section may be replaced with a so-call mouse, a joy stick or the like as a pointing device.

(3) In this embodiment, as a conversion value for narrowing the difference in player parameter between each player card 9, the conversion-value calculating section 412 calculates, for each type of player card, a conversion value for making the player-parameter ability value higher as the calculated use rate becomes lower. Conversely, it may calculates, for each type of player card, a conversion value for making the player-parameter ability value lower as the calculated use rate becomes higher, thereby narrowing the difference in player parameter between each player card 9.

(4) In this embodiment, a conversion value is calculated based on the use rate, but instead, the use rate itself may be treated as a conversion value for giving a division to the player-parameter ability value (similarly, the reciprocal of the use rate may be treated as a conversion value for giving a multiplication to the player-parameter ability value), thereby calculating a conversion value in a simpler manner.

(5) In this embodiment, one sequence is processed simply with a single pitch; a game may be processed by the baseball rules, or one sequence processed with two pitches, however.

(6) The batting result is set as a ballistic trajectory (batted-ball speed and powerfulness), and hits and outs are left to the following calculations (except strikeouts). However, the batting result may be determined including hits and outs.

(7) This embodiment is described using a role-playing game by the pitcher (field-taking) side and the batter (at-bat) side in simulated baseball; the present invention is not limited to a baseball game, however. Any two-person game can be applied as long as a self-character and an opponent character displayed on a display play roles in offense and defense via a game medium. There are, for example, a soccer game in which the shooter (offense) side and the goalkeeper (defense) side confront each other in a simulated penalty shoot-out, a fighting game in which the puncher (attacking) side and the dodger (guarding) side confront each other, and a gun-shooting game or the like in which the gun-or-rifle shooter (attacking) side and the dodger (guarding) side confront each other.

As described so far, the novel game system includes a plurality of game machines and at least one server device connected thereto over a network to enable players of the plurality of game machines to play a two-person game.

The server device includes: an acquiring means for, among a predetermined number of character cards each associating a game character with an ability value indicating an ability in fighting motion, acquiring use information on the type of a character card presently used in a two-person game for each game; a conversion-value calculating means for calculating a conversion value as result data for narrowing the difference of the ability values corresponding to the types of character cards according to the type of the character card depending upon the amount of the acquired use information; and a transmitting means for associating the conversion value according to the type of the character card with each character card and transmitting the conversion value to each game machine.

The plurality of game machines each include: a display displaying the image of a game character appearing in a two-person game; an operating member receiving an instruction for a virtual fighting motion played by the game character in the two-person game; a reading means for reading at least the type of each character card used in a game; an ability-value calculating means for converting the ability value corresponding to each read character card into a new ability value using the conversion value corresponding to a character card presently used; and a controlling means for allowing a game character to play a fighting motion given by an instruction from the operating member using the ability value obtained by the conversion.

According to this configuration, the display displays the image of a game character corresponding to a used character card, and the contents of an instruction for a fighting motion in the two-person game given to the game character from the operating member are mutually transmitted and received over the network, thereby making the two-person game feasible. The server device allows the acquiring means to acquire use information on the type of a character card presently used in the two-person game for each game, and sequentially, a conversion value as the result data for narrowing the difference of the ability values corresponding to the types of character cards is calculated according to the type of the character card depending upon the amount of the use information acquired by the acquiring means. Then, the calculated conversion value according to the type of the character card is associated with the type of each character card by the transmitting means and is transmitted to each game machine. On the other hand, each game machine allows the reading means to read the type of each character card used in the two-person game, and the reading result is transmitted to the acquiring means. The ability-value calculating means converts the ability value corresponding to each read character card into a new ability value using the conversion value corresponding to a character card presently used. Then, the controlling means allows a game character to play a fighting motion given by an instruction from the operating member using the ability value obtained by the conversion.

Accordingly, a conversion value for narrowing the difference of the ability values corresponding to the types of character cards is calculated as the result data according to the type of the character card, and a game character plays a fighting motion using the ability value obtained by the conversion. Therefore, even if a character card has, for example, a lower use rate and so to speak, is unpopular, then the game character thereof plays a two-person game more evenly against a game character corresponding to a character card having a higher use rate and so to speak, being popular than in the case of the original ability values. Hence, a player having fewer player cards could play a two-person game with highly motivated against a player who has more player cards, in other words, or possesses more character cards having greater ability values in respect of probability.

Since a predetermined number of game characters are necessary for executing a game, a game player cannot play the game itself until securing the predetermined number of character cards. In order to manage the inconvenience, however, for example, a minimum number of character cards for executing the game may be purchased beforehand at a specified shop or a vending machine. Alternatively, as described later, it may be appreciated that the number of game characters necessary for executing the game in a storage section inside of a game machine is registered in advance in such a way that they can be chosen as electronic data and image data such as individual ability values. Among the registered game characters, at first, the predetermined number or the shortage number are chosen and used, thereby making the game feasible.

In the above game system, it is preferable that the conversion-value calculating means calculates a use rate for each type of character card using the acquired use information, and using the calculated use rate, calculates a conversion value for making the ability value higher as the use rate becomes lower.

According to this configuration, a use rate for each type of character card is calculated using the use information acquired by the acquiring means, and using the calculated use rate, a conversion value for making the ability value higher as the use rate becomes lower is calculated, thereby offering a variety of ability values easily.

In the above game system, it is preferable that the conversion-value calculating means calculates a use rate for each type of character card using the acquired use information, and using the calculated use rate, calculates a conversion value for making the ability value lower as the use rate becomes higher.

According to this configuration, a use rate for each type of character card is calculated using the use information acquired by the acquiring means, and using the calculated use rate, a conversion value for making the ability value lower as the use rate becomes higher is calculated, thereby offering a variety of ability values easily.

Furthermore, in the above game system, it is preferable that the conversion-value calculating means calculates a use rate for each type of character card using the acquired use information and sets the calculated use rate as the conversion value for division.

According to this configuration, a use rate for each type of character card is calculated using the use information acquired by the acquiring means, and the calculated use rate itself is set as the conversion value for division (for an ability value).

In the above game system, it is preferable that the game machines each include a card issuing means for, among many types of character cards incorporated therein, issuing a predetermined number of character cards to a player every time a game ends.

According to this configuration, the game machine includes many types of character cards incorporated in advance in a housing section or the like, and if a game is detected ending, the card issuing means gives out the predetermined number, for example, one. This enables a player to increase the number of character cards by the predetermined number every time the player plays a game, even though the player possesses a small number of character cards at first.

Moreover, it is preferable that the card issuing means issues one character card at random every time a game ends.

According to this configuration, a type of character card acquired every time a game ends is chosen at random from among many types of character cards, and hence, a player can not necessarily acquire a character card corresponding to a game character having a higher ability value, thereby offering the player a feeling of expectation for the game system.

In the above game system, it is preferable that the conversion-value calculating means updates the conversion value using the use information acquired during a predetermined period.

According to this configuration, the conversion value is calculated or updated at a predetermined period. The predetermined period may be preferably one day, for example, taking into account enjoying a game using a new conversion value the next morning by updating the conversion value in the middle of the night. Alternatively, it may be appreciated that it is morning and afternoon, or oppositely, a long time such as one week. In this way, the conversion value is updated at the predetermined period, and even if the same character cards are used, a difference may be produced in fighting ability between the game the last time and the game this time, thereby making the game more interesting. Besides, the predetermined period is not limited to a fixed period; it may be updated when the number of two-person games acquired by the acquiring means of the server device reaches a predetermined number or when the maximum use frequency of the character card presently used reaches a predetermined number.

In the above game system, it is preferable that the transmitting means transmits a conversion value to each game machine every time the conversion value is calculated.

According to this configuration, regardless of the use situation of a game machine, the conversion value calculated by the server device is transmitted to, for example, each game machine impartially whose power is turned on, a game machine in which a game is presently played, or a game machine in the case where a corresponding character card is used during a game or in such another. Therefore, the calculated conversion value is certainly used on the game-machine side and thereby reflected on a fighting motion for game characters.

In the above game system, it is preferable that the acquiring means further monitors the utilization situation of each game machine, and the transmitting means transmits the calculated conversion value to a game machine starting a two-person game.

According to this configuration, the calculated conversion value is transmitted to a game machine starting a two-person game, thereby transmitting data efficiently.

In the above game system, it is preferable that the conversion-value calculating means utilizes the ratio of the highest use rate of calculated use frequencies to the use rate of each character card.

According to this configuration, each use rate is, so to speak, normalized by the highest use rate, and hence, regardless of the number of executed games, the rate can be utilized. The use rate is practically equivalent to a use frequency because the number of games in execution is common thereto as the population parameter.

In the above game system, it is preferable that the game machines each includes an incorporated character storage section storing a required number of incorporated characters associated with the ability value indicating an ability in fighting motion, and the controlling means allows the operating member to designate an incorporated character from the incorporated character storage section in a two-person game to thereby make the incorporated character appear in the two-person game using no character card.

According to this configuration, since a predetermined number of game characters are necessary for executing a game, a game player cannot play the game itself until securing the predetermined number of character cards. Therefore, if the number of game characters necessary for executing the game in the incorporated character storage section inside of the game machine is registered (stored) in advance in such a way that they can be chosen as electronic data and image data such as individual ability values, then at first, the predetermined number among the registered game characters are used, or the shortage number according to the number of acquired character cards are chosen and substituted (appear in the two-person game) from among the registered game characters, thereby making the game feasible.

In the above game system, it is preferable that: the two-person game is a simulated baseball game; the character cards are distinguished at least between pitchers and fielders; the character cards for pitchers are each associated with an ability value indicating a pitching ability while the character cards for fielders are each associated with an ability value indicating a batting ability; the game machines each includes a placement section for placing at least nine types of character cards; and the reading means reads all the types of character cards on the placement section.

According to this configuration, the character cards are at least for pitchers and fielders, and at least nine types of character cards in total can be placed on the placement section of each game machine. The reading means reads the types of at least nine character cards placed on the placement section, thereby associating the character cards with the ability values and the game characters.

In the above game system, it is preferable that the ability values are each stored in the corresponding character card, and the reading means reads the type and ability value of each character card.

According to this configuration, the reading means can read the type and ability value of each character card, and hence, there is no need for the game machine to electronically hold data on the ability value of each game character.

In the above game system, it is preferable that the game machines each includes an ability-value storage section associating and storing the ability value of each game character with the corresponding type of character card, and the ability-value calculating means converts to a new ability value using the ability value of a game character corresponding to the type of a character card read by the reading means and the conversion value.

According to this configuration, the ability value of a game character corresponding to the type of a character card read by the reading means is read from the ability-value storage section, and a new ability value is obtained using this ability value and the ability conversion value. Therefore, a collating means associates the type of a character card read by the reading means with the ability value of a game character, and the association result is led to the ability-value calculating means and thereby used for calculating the ability value of each character card (each game character).

In addition, a novel game execution managing method for managing the execution of a game in a game system which includes a display displaying the image of a game character appearing in a two-person game and an operating member receiving an instruction for a virtual fighting motion played by the game character in the two-person game, and includes a plurality of game machines which, using a predetermined number of character cards each associating the game character with an ability value indicating an ability in the fighting motion, transmits and receives the ability value corresponding to each character card and the contents of an instruction from the operating member over a network to thereby enable players of the plurality of game machines to play a two-person game using each ability value, and a server device which collects information on the situation of a game played in the plurality of game machines and reflects result data obtained from the collected information upon the two-person game, comprising the steps of: reading at least the type of each character card used for a two-person game in each game machine; acquiring use information on the type of a character card presently used in a game for each game; calculating a conversion value as result data for narrowing the difference of the ability values corresponding to the types of character cards according to the type of the character card depending upon the amount of the acquired use information; associating the conversion value according to the type of the character card with each character card and transmitting the conversion value to each game machine; converting the ability value corresponding to each read character card into a new ability value using the conversion value corresponding to a character card presently used; and allowing a game character to play a fighting motion given by an instruction from the operating member using the ability value obtained by the conversion.

According to this configuration, in the above game system: at least the type of each character card used for a two-person game is read in each game machine; use information on the type of a character card presently used in a game is acquired for each game; a conversion value for narrowing the difference of the ability values corresponding to the types of character cards is calculated as result data according to the type of the character card depending upon the amount of the acquired use information; the conversion value according to the type of the character card is associated with each character card and is transmitted to each game machine; the ability value corresponding to each read character card is converted into a new ability value using the conversion value corresponding to a character card presently used; and a game character is allowed to play a fighting motion given by an instruction from the operating member using the ability value obtained by the conversion. Therefore, even if a character card has a lower use rate and so to speak, is unpopular, then the game character thereof plays a two-person game more evenly against a game character corresponding to a character card having a higher use rate and so to speak, being popular than in the case of the original ability values. Hence, a player having fewer player cards could play a two-person game with highly motivated against a player who has more player cards, in other words, or possesses more character cards having greater ability values in respect of probability.

Industrial Applicability

The present invention provides a game system capable of converting the ability value of each character in a two-person network game using character cards, which is full of variety, thereby motivating players to play the game.

The invention claimed is:

1. A game system which includes a plurality of game machines and at least one server device connected thereto over a network to enable players of the plurality of game machines to play a two-person game, wherein the server device includes: an acquiring means for, among a predetermined number of character cards each associating a game character with an ability value indicating an ability in fighting motion, acquiring type information on the type of a character card presently used in a two-person game for each game; a conversion-value calculating means for calculating a conversion value as result data for narrowing the difference of the ability values corresponding to the types of character cards according to the type of the character card and an amount of the acquired type information; and a transmitting means for associating the conversion value according to the type of the character card with each character card and transmitting the conversion value to all the game machines, and the plurality of game machines each include: a display displaying the image of a game character appearing in a two-person game; an operating member receiving an instruction for a virtual fighting motion played by the game character in the two-person game; a reading means for reading type information from each character card used in a game; a communicating means for transmitting the type information read by the reading means to the server device; an ability-value storing means for storing an ability value, corresponding to the type information; a conversion-value storing means for storing a conversion value transmitted from the transmitting means; an ability-value calculating means for converting the ability value corresponding to the type information of each read character card into a new ability value using the conversion value corresponding to a character card presently used; and a controlling means for allowing a game character to play a fighting motion given by an instruction from the operating member using the ability value obtained by the conversion;

wherein the ability-value storing means stores the ability value of each game character in association with the type information of a character card; and wherein the ability-value calculating means converts to a new ability value using the ability value of a game character corresponding to the type information of a character card read by the reading means and the conversion value.

2. The game system according to claim 1, wherein the conversion-value calculating means calculates a use rate for each type of character card using the acquired type information, and using the calculated use rate, calculates a conversion value for making the ability value higher as the use rate becomes lower.

3. The game system according to claim 2, wherein the conversion-value calculating means utilizes the ratio of the highest use rate of calculated use frequencies to the use rate of each character card.

4. The game system according to claim 1, wherein the conversion-value calculating means calculates a use rate for each type of character card using the acquired type information, and using the calculated use rate, calculates a conversion value for making the ability value lower as the use rate becomes higher.

5. The game system according to claim 1, wherein the conversion-value calculating means calculates a use rate for each type of character card using the acquired type information and sets the calculated use rate as the conversion value for division.

6. The game system according to claim 1, wherein the game machines each includes an incorporated character storage section storing a required number of incorporated characters associated with the ability value indicating an ability in fighting motion, and the controlling means allows the operating member to designate an incorporated character from the incorporated character storage section in a two-person game to thereby make the incorporated character appear in the two-person game using no character card.

7. A game system which includes a plurality of game machines and at least one server device connected thereto over a network to enable players of the plurality of game machines to play a two-person game, wherein the server device includes: an acquiring means for, among a predetermined number of character cards each associating a game character with an ability value indicating an ability in fighting motion, acquiring use information on the type of a character card presently used in a two-person game for each game; a conversion-value calculating means for calculating a conversion value as result data for narrowing the difference of the ability values corresponding to the types of character cards according to the type of the character card depending upon the amount of the acquired use information; and a transmitting means for associating the conversion value according to the type of the character card with each character card and transmitting the conversion value to each game machine, and the plurality of game machines each include: a display displaying the image of a game character appearing in a two-person game; an operating member receiving an instruction for a virtual fighting motion played by the game character in the two-person game; a reading means for reading at least the type of each character card used in a game; an ability-value calculating means for converting the ability value corresponding to each read character card into a new ability value using the conversion value corresponding to a character card presently used; and a controlling means for allowing a game character to play a fighting motion given by an instruction from the operating member using the ability value obtained by the conversion; and wherein the conversion-value calculating means calculates a use rate for each type of character card using the acquired use information, and using the calculated use rate, calculates a conversion value for making the ability value higher as the use rate becomes lower.

8. A game system which includes a plurality of game machines and at least one server device connected thereto over a network to enable players of the plurality of game machines to play a two-person game, wherein the server device includes: an acquiring means for, among a predetermined number of character cards each associating a game character with an ability value indicating an ability in fighting motion, acquiring use information on the type of a character card presently used in a two-person game for each game; a conversion-value calculating means for calculating a conversion value as result data for narrowing the difference of the ability values corresponding to the types of character cards according to the type of the character card depending upon the amount of the acquired use information; and a transmitting means for associating the conversion value according to the type of the character card with each character card and transmitting the conversion value to each game machine, and the plurality of game machines each include: a display displaying the image of a game character appearing in a two-person game; an operating member receiving an instruction for a virtual fighting motion played by the game character in the two-person game; a reading means for reading at least the type of each character card used in a game; an ability-value calculating means for converting the ability value corresponding to each read character card into a new ability value using the conversion value corresponding to a character card presently used; and a controlling means for allowing a game character to play a fighting motion given by an instruction from the operating member using the ability value obtained by the conversion; and wherein the conversion-value calculating means calculates a use rate for each type of character card using the acquired use information, and using the calculated use rate, calculates a conversion value for making the ability value lower as the use rate becomes higher.

9. A game system which includes a plurality of game machines and at least one server device connected thereto over a network to enable players of the plurality of game machines to play a two-person game, wherein the server device includes: an acquiring means for, among a predetermined number of character cards each associating a game character with an ability value indicating an ability in fighting motion, acquiring use information on the type of a character card presently used in a two-person game for each game; a conversion-value calculating means for calculating a conversion value as result data for narrowing the difference of the ability values corresponding to the types of character cards according to the type of the character card depending upon the amount of the acquired use information; and a transmitting means for associating the conversion value according to the type of the character card with each character card and transmitting the conversion value to each game machine, and the plurality of game machines each include: a display displaying the image of a game character appearing in a two-person game; an operating member receiving an instruction for a virtual fighting motion played by the game character in the two-person game; a reading means for reading at least the type of each character card used in a game; an ability-value calculating means for converting the ability value corresponding to each read character card into a new ability value using the conversion value corresponding to a character card presently used; and a controlling means for allowing a game character to play a fighting motion given by an instruction from the operating member using the ability value obtained by the conversion; and wherein the conversion-value calculating means calculates a use rate for each type of character card using the acquired use information and sets the calculated use rate as the conversion value for division.

10. The game system according to claim 1, wherein the game machines each include a card issuing means for, among many types of character cards incorporated therein, issuing a predetermined number of character cards to a player every time a game ends.

11. The game system according to claim 10, wherein the card issuing means discharges one character card at random every time a game ends.

12. The game system according to claim 1, wherein the conversion-value calculating means updates the conversion value using the type information acquired during a predetermined period.

13. The game system according to claim 1, wherein the transmitting means transmits a conversion value to each game machine every time the conversion value is calculated.

14. The game system according to claim 13, wherein the acquiring means monitors the utilization situation of each game machine, and the transmitting means transmits the calculated conversion value to a game machine starting a two-person game.

15. The game system according to claim 7, wherein the conversion-value calculating means utilizes the ratio of the highest use rate of calculated use frequencies to the use rate of each character card.

16. A game system which includes a plurality of game machines and at least one server device connected thereto over a network to enable players of the plurality of game machines to play a two-person game, wherein the server device includes: an acquiring means for, among a predetermined number of character cards each associating a game character with an ability value indicating an ability in fighting motion, acquiring use information on the type of a character card presently used in a two-person game for each game; a conversion-value calculating means for calculating a conversion value as result data for narrowing the difference of the ability values corresponding to the types of character cards according to the type of the character card depending upon the amount of the acquired use information; and a transmitting means for associating the conversion value according to the type of the character card with each character card and transmitting the conversion value to each game machine, and the plurality of game machines each include: a display displaying the image of a game character appearing in a two-person game; an operating member receiving an instruction for a virtual fighting motion played by the game character in the two-person game; a reading means for reading at least the type of each character card used in a game; an ability-value calculating means for converting the ability value corresponding to each read character card into a new ability value using the conversion value corresponding to a character card presently used; and a controlling means for allowing a game character to play a fighting motion given by an instruction from the operating member using the ability value obtained by the conversion; and wherein the game machines each includes an incorporated character storage section storing a required number of incorporated characters associated with the ability value indicating an ability in fighting motion, and the controlling means allows the operating member to designate an incorporated character from the incorporated character storage section in a two-person game to thereby make the incorporated character appear in the two-person game using no character card.

17. The game system according to claim 1, wherein: the two-person game is a simulated baseball game; the character cards are distinguished at least between pitchers and fielders; the character cards for pitchers are each associated with an ability value indicating a pitching ability while the character cards for fielders are each associated with an ability value indicating a batting ability; the game machines each includes a placement section for placing at least nine types of character cards; and the reading means reads all the types of character cards on the placement section.

18. The game system according to claim 1, wherein the ability values are each stored in the corresponding character card, and the reading means reads the type and ability value of each character card.

19. A game execution managing method for managing the execution of a game in a game system which includes a display displaying the image of a game character appearing in a two-person game and an operating member receiving an instruction for a virtual fighting motion played by the game character in the two-person game, and includes a plurality of game machines which, using a predetermined number of character cards each associating the game character with an ability value indicating an ability in the fighting motion, transmits and receives the ability value corresponding to each character card and the contents of an instruction from the operating member over a network to thereby enable players of the plurality of game machines to play a two-person game using each ability value, and a server device which collects information on the situation of a game played in the plurality of game machines and reflects result data obtained from the collected information upon the two-person game, comprising the steps of:

reading at least the type of each character card used for a two-person game in each game machine;

acquiring type information from a character card presently used in a game for each game;

calculating a conversion value as result data for narrowing the difference of the ability values corresponding to the types of character cards according to the type of the character card and an amount of the acquired use information;

associating the conversion value according to the type of the character card with each character card and transmitting the conversion value to all game machines;

converting the ability value corresponding to each read character card into a new ability value using the conversion value corresponding to a character card presently used; and allowing a game character to play a fighting motion given by an instruction from the operating member using the ability value obtained by the conversion;

wherein the game system includes an ability-value storing means for storing the ability value of each game character in association with the type information of a character card; and wherein the ability-value calculating means converts to a new ability value using the ability value of a game character corresponding to the type information of a character card read by the acquiring means of the game system and the conversion value.

\* \* \* \* \*